(12) United States Patent
Chak

(10) Patent No.: US 9,664,275 B2
(45) Date of Patent: May 30, 2017

(54) ZERO BACKLASH RIGHT ANGLE TRANSMISSION SYSTEM AND METHOD

(71) Applicant: Chu Kwong Chak, Hong Kong (HK)

(72) Inventor: Chu Kwong Chak, Hong Kong (HK)

(*) Notice: Subject to any disclaimer, the term of this patent is extended or adjusted under 35 U.S.C. 154(b) by 0 days.

(21) Appl. No.: 15/215,533

(22) Filed: Jul. 20, 2016

(65) Prior Publication Data

US 2017/0023126 A1 Jan. 26, 2017

Related U.S. Application Data

(60) Provisional application No. 62/195,259, filed on Jul. 21, 2015.

(51) Int. Cl.
*F16H 57/12* (2006.01)
*F16H 1/20* (2006.01)
*F16H 37/04* (2006.01)

(52) U.S. Cl.
CPC ............ *F16H 57/12* (2013.01); *F16H 1/203* (2013.01); *F16H 1/206* (2013.01); *F16H 37/041* (2013.01)

(58) Field of Classification Search
CPC ........ F16H 27/12; F16H 37/041; F16H 1/206; F16H 1/203
USPC .... 475/207, 218, 219, 330, 343; 74/665 GB, 74/665 GC, 417, 420
See application file for complete search history.

(56) References Cited

U.S. PATENT DOCUMENTS

| | | | | |
|---|---|---|---|---|
| 4,515,043 A * | 5/1985 | Gray | .................... | B23P 19/069 74/665 GB |
| 4,718,508 A * | 1/1988 | Tervola | ................. | B62D 11/10 180/6.44 |
| 6,634,861 B1 * | 10/2003 | Altamura | ................ | B64C 27/28 244/170 |
| 6,855,087 B2 * | 2/2005 | Chakraborty | .......... | B60K 17/16 475/225 |
| 7,357,747 B2 * | 4/2008 | Hamilton | ............... | B62D 11/16 475/18 |
| 2001/0008859 A1 * | 7/2001 | Masaki | .................. | B60K 6/445 475/5 |
| 2010/0279812 A1 * | 11/2010 | Ha | ........................... | F16H 3/72 475/207 |
| 2015/0075325 A1 * | 3/2015 | Green | ...................... | F16H 1/22 74/664 |

FOREIGN PATENT DOCUMENTS

JP S6091061 A 5/1985

OTHER PUBLICATIONS

International Search Report of PCT Patent Application No. PCT/CN2016/090779 issued on Oct. 14, 2016.

* cited by examiner

*Primary Examiner* — Roger Pang

(57) ABSTRACT

A zero backlash right angle transmission system includes an input shaft with an input gear, an output shaft, first and second drive gears mounted on respective drive shafts and meshing with the input gear, and first and second pairs of meshing gears, rotation axes of which are disposed at right angle to each other. One of the pair of meshing gears is mounted on the drive shaft and the other one is mounted on the output shaft. The system may also include first and second planetary gear assemblies. All of the gears form a closed loop gear train that drives the output shaft forward and backward without backlash. A method for zero backlash right angle transmission is also disclosed.

11 Claims, 42 Drawing Sheets

ZERO BACKLASH RIGHT ANGLE TRANSMISSION SYSTEM AND METHOD

CROSS-REFERENCE TO RELATED APPLICATIONS

This application claims the benefit of U.S. Provisional Patent Application No. 62/195,259, filed Jul. 21, 2015, the entire content of which is hereby incorporated by reference.

FIELD OF THE APPLICATION

The present application generally relates to rotational joint transmission mechanism for use in robots and other systems, and particularly relates to a zero backlash right angle transmission system. The application also relates to a method for zero backlash right angle transmission.

BACKGROUND OF THE APPLICATION

It is well known that motor, directly driving robot arm rotational joint without reduction gear assembly, allows very precise position control. However, the motor size must be large in order to provide sufficient torque and high resolution motor shaft encoder is required for use in end point accuracy. Although small motor with speed reduction gears is able to give higher torque, high repeatability is hard to achieve due to backlash existing between the gears of speed reduction gear assembly. Encoder of high resolution can be applied at the end point to increase accuracy but the feedback position control of high bandwidth will be difficult to achieve if there exists backlash which leads to vibration of motor shaft all the time. Thus, if there is a way to use small motor with backlash eliminated, speed reduction gears can be introduced to increase torque with the presence of feedback position control of high bandwidth.

On the other hand, right angle transmission for robot arm joint facilitates the design of robot arm of compact size because the motor is able to be put along the robot arm to provide torque to the joint through right angle transmission.

SUMMARY

According to one aspect, there is provided a zero backlash right angle transmission system including:
  an input shaft with an input gear mounted thereon;
  an output shaft;
  first and second drive gears meshing with the input gear, and mounted respectively on first and second drive shafts parallel to the input shaft;
  a first right angle transmission gear assembly including a first pair of meshing gears, rotation axes of which are disposed at right angle to each other, one of the first pair of meshing gears being mounted on the first drive shaft and the other one of the first pair of meshing gears being mounted on the output shaft; and
  a second right angle transmission gear assembly including a second pair of meshing gears, rotation axes of which are disposed at right angle to each other, one of the second pair of meshing gears being mounted on the second drive shaft and the other one of the second pair of meshing gears being mounted on the output shaft at a distance from and parallel to the other one of the first pair of meshing gears;
  wherein all of the gears form a closed loop gear train that drives the output shaft forward and backward without backlash.

In one embodiment, the zero backlash right angle transmission system further includes a first planetary gear assembly mounted between the first drive gear and the one of the first pair of meshing gears, and a second planetary gear assembly mounted between the second drive gear and the one of the second pair of meshing gears. The first planetary gear assembly includes a first sun gear mounted on a first sun shaft on which the first drive gear is mounted; a first ring gear; a first plurality of planet gears mounted on a first plurality of planet shafts, and meshing with the first sun gear and the first ring gear; and a first carrier carrying the first plurality of planet shafts and mounted on a first carrier shaft on which the one of the first pair of meshing gears is mounted. The second planetary gear assembly includes a second sun gear mounted on a second sun shaft on which the second drive gear is mounted; a second ring gear; a second plurality of planet gears mounted on a second plurality of planet shafts, and meshing with the second sun gear and the second ring gear; and a second carrier carrying the second plurality of planet shafts and mounted on a second carrier shaft on which the one of the second pair of meshing gears is mounted.

In one embodiment, the zero backlash right angle transmission system further includes a first planetary gear assembly coupled with the other one of the first pair of meshing gears and coaxially disposed at a first end of the output shaft, and a second planetary gear assembly coupled with the other one of the second pair of meshing gears and coaxially disposed at a second end of the output shaft. The first planetary gear assembly includes a first sun gear mounted on a first hollow sun shaft coupled with the other one of the first pair of meshing gears and sleeved around the output shaft; a first ring gear; a first plurality of planet gears mounted on a first plurality of planet shafts, and meshing with the first sun gear and the first ring gear; and a first carrier carrying the first plurality of planet shafts and mounted on a first hollow carrier shaft sleeved around the first end of the output shaft. The second planetary gear assembly includes a second sun gear mounted on a second hollow sun shaft coupled with the other one of the second pair of meshing gears and sleeved around the output shaft; a second ring gear; a second plurality of planet gears mounted on a second plurality of planet shafts, and meshing with the second sun gear and the second ring gear; and a second carrier carrying the second plurality of planet shafts and mounted on a second hollow carrier shaft sleeved around the output shaft.

In one embodiment, the zero backlash right angle transmission system further includes a first planetary gear assembly mounted between the first drive gear and the one of the first pair of meshing gears, a second planetary gear assembly mounted between the second drive gear and the one of the second pair of meshing gears, a third planetary gear assembly coupled with the other one of the first pair of meshing gears and coaxially disposed at a first end of the output shaft, and a fourth planetary gear assembly coupled with the other one of the second pair of meshing gears and coaxially disposed at a second end of the output shaft. The first planetary gear assembly includes a first sun gear mounted on a first sun shaft on which the first drive gear is mounted; a first ring gear; a first plurality of planet gears mounted on a first plurality of planet shafts, and meshing with the first sun gear and the first ring gear; and a first carrier carrying the first plurality of planet shafts and mounted on a first carrier shaft on which the one of the first pair of meshing gears is mounted. The second planetary gear assembly includes a second sun gear mounted on a second sun shaft on which the second drive gear is mounted; a second ring gear; a second plurality of planet gears mounted on a second plurality of planet shafts, and meshing with the second sun gear and the second ring gear; and a second carrier carrying the second plurality of planet shafts and mounted on a second carrier shaft on which the one of the second pair of meshing gears is mounted. The third planetary gear assembly includes a third sun gear mounted on a third hollow sun shaft coupled with the other one of the first pair of meshing gears and sleeved around the output shaft; a third ring gear; a third plurality of planet gears mounted on a third plurality of planet shafts, and meshing with the third sun gear and the third ring gear; and a third carrier carrying the third plurality of planet shafts and mounted on a third hollow carrier shaft sleeved around the output shaft. The fourth planetary gear assembly includes a fourth sun gear mounted on a fourth hollow sun shaft coupled with the other one of the second pair of meshing gears and sleeved around the output shaft; a fourth ring gear; a fourth plurality of planet gears mounted on a fourth plurality of planet shafts, and meshing with the fourth sun gear and the fourth ring gear; and a fourth carrier carrying the fourth plurality of planet shafts and mounted on a fourth hollow carrier shaft sleeved around the output shaft.

In one embodiment, the input gear, the first drive gear and the second drive gear are selected from the group consisting of spur gears, single helical gears, and double helical gears; and the first and second pairs of meshing gears are selected from the group consisting of Bevel gears, Miter gears, crown gears, hypoid gears, and spiral helical gears.

According to another aspect, there is provided a zero backlash right angle transmission method including:
  providing an input shaft with an input gear mounted thereon;
  providing an output shaft disposed at right angle with respect to the input shaft;
  providing a first gear train mounted between the input gear and the output shaft for rotation in one direction;
  providing a second gear train mounted between the input gear and the output shaft for rotation in an opposite direction, the first and second gear trains being disposed in parallel relationship and formed into a closed loop gear train;
  preloading the first gear train with torque in the one direction; and
  preloading the second gear train with torque in the opposite direction, thereby eliminating backlash of the first and second gear trains when the input shaft is rotated in either direction.

In one embodiment, the first gear train includes a first drive gear meshing with the input gear, and mounted on a first drive shaft parallel to the input shaft; and a first right angle transmission gear assembly including a first pair of meshing gears, rotation axes of which are disposed at right angle to each other, one of the first pair of meshing gears being mounted on the first drive shaft and the other one of the first pair of meshing gears being mounted on the output shaft; and the second gear train includes a second drive gear meshing with the input gear, and mounted on a second drive shaft parallel to the input shaft; and a second right angle transmission gear assembly including a second pair of meshing gears, rotation axes of which are disposed at right angle to each other, one of the second pair of meshing gears being mounted on the second drive shaft and the other one of the second pair of meshing gears being mounted on the output shaft at a distance from and parallel to the other one of the first pair of meshing gears.

In one embodiment, the first gear train further includes a first planetary gear assembly mounted between the first drive gear and the one of the first pair of meshing gears; and the second gear train further includes a second planetary gear assembly mounted between the second drive gear and the one of the second pair of meshing gears.

In one embodiment, the first gear train further includes a first planetary gear assembly coupled with the other one of the first pair of meshing gears and coaxially disposed at a first end of the output shaft; and the second gear train includes a second planetary gear assembly coupled with the other one of the second pair of meshing gears and coaxially disposed at a second end of the output shaft.

In one embodiment, the first gear train further includes a first planetary gear assembly mounted between the first drive gear and the one of the first pair of meshing gears, and a third planetary gear assembly coupled with the other one of the first pair of meshing gears and coaxially disposed at a first end of the output shaft; and the second gear train includes a second planetary gear assembly mounted between the second drive gear and the one of the second pair of meshing gears, and a fourth planetary gear assembly coupled with the other one of the second pair of meshing gears and coaxially disposed at a second end of the output shaft.

In one embodiment, the input gear, the first drive gear and the second drive gear are selected from the group consisting of spur gears, single helical gears, and double helical gears; and the first and second pairs of meshing gears are selected from the group consisting of Bevel gears, Miter gears, crown gears, hypoid gears, and spiral helical gears.

Although the zero backlash right angle transmission system is shown and described with respect to certain embodiments, it is obvious that equivalents and modifications will occur to others skilled in the art upon the reading and understanding of the specification. The zero backlash right angle transmission system in the present application includes all such equivalents and modifications, and is limited only by the scope of the claims.

BRIEF DESCRIPTION OF THE DRAWING FIGURES

Specific embodiments of the zero backlash right angle transmission system will now be described by way of example with reference to the accompanying drawings wherein:

FIGS. 1k-1m show spur gears, single helical gears, and double helical gears of the input/drive gear assembly respectively according to various embodiments of the present application.

Figure 9A:
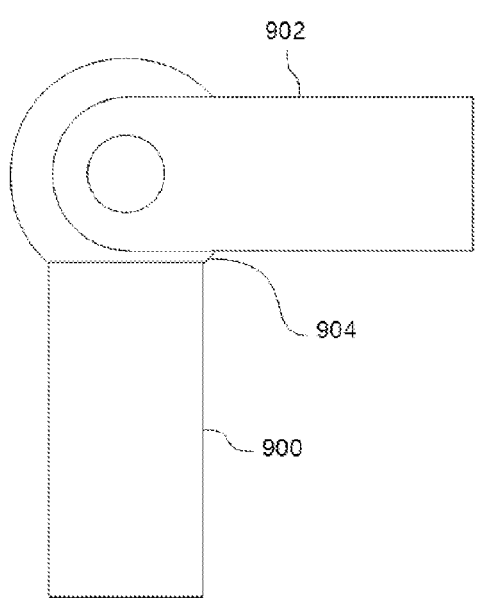
Figure 9B:
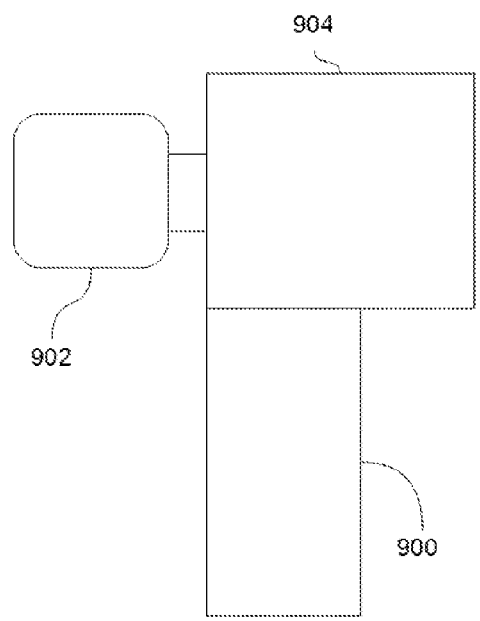

FIGS. 9(a) and 9(b) are side and front views of a conventional design of a robotic arm joint.

Figure 10A:
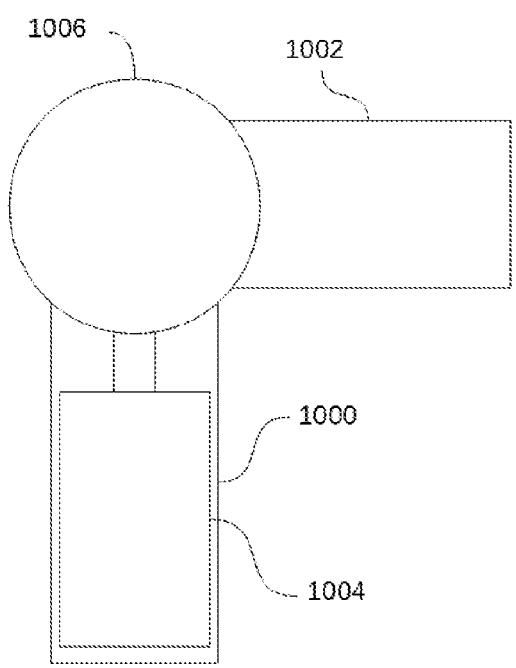
Figure 10B:
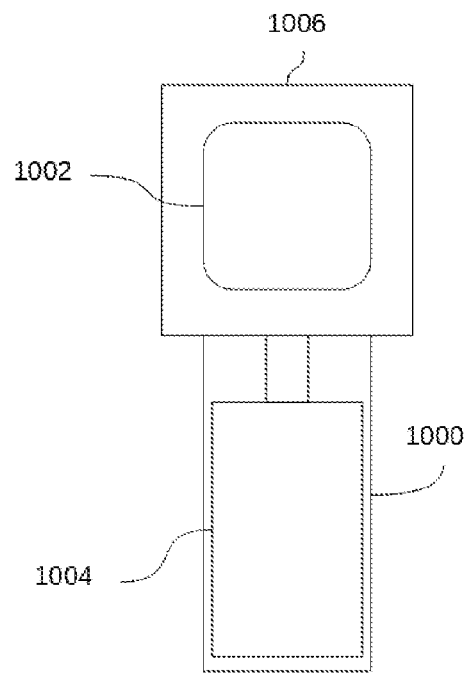

FIGS. 10(a) and 10(b) are side and front views of a robotic arm joint with the zero backlash right angle transmission system of the present application incorporated therein.

Figure 11A:
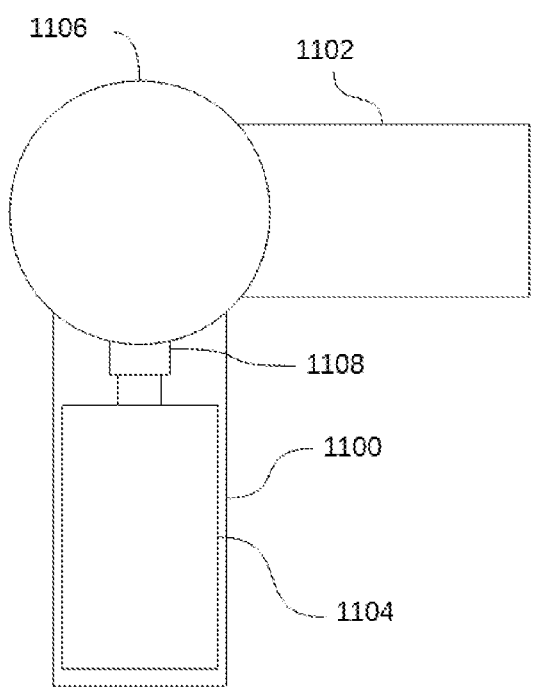
Figure 11B:
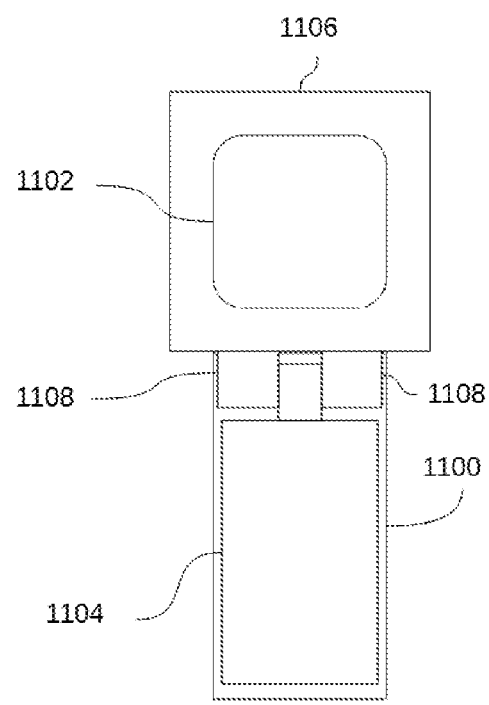

FIGS. 11(a) and 11(b) are side and front views of another robotic arm joint with the zero backlash right angle transmission system of the present application incorporated therein.

DETAILED DESCRIPTION OF THE APPLICATION

Reference will now be made in detail to a preferred embodiment of the zero backlash right angle transmission system, examples of which are also provided in the following description. Exemplary embodiments of the zero backlash right angle transmission system are described in detail, although it will be apparent to those skilled in the relevant art that some features that are not particularly important to an understanding of the zero backlash right angle transmission system may not be shown for the sake of clarity.

Furthermore, it should be understood that the zero backlash right angle transmission system is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

It should be noted that throughout the specification and claims herein, when one element is said to be "coupled" or "connected" to another, this does not necessarily mean that one element is fastened, secured, or otherwise attached to another element. Instead, the term "coupled" or "connected" means that one element is either connected directly or indirectly to another element or is in mechanical or electrical communication with another element.

The present application relates to a zero backlash right angle transmission system and a method for zero backlash right angle transmission.

First Embodiment

Figure 1A:
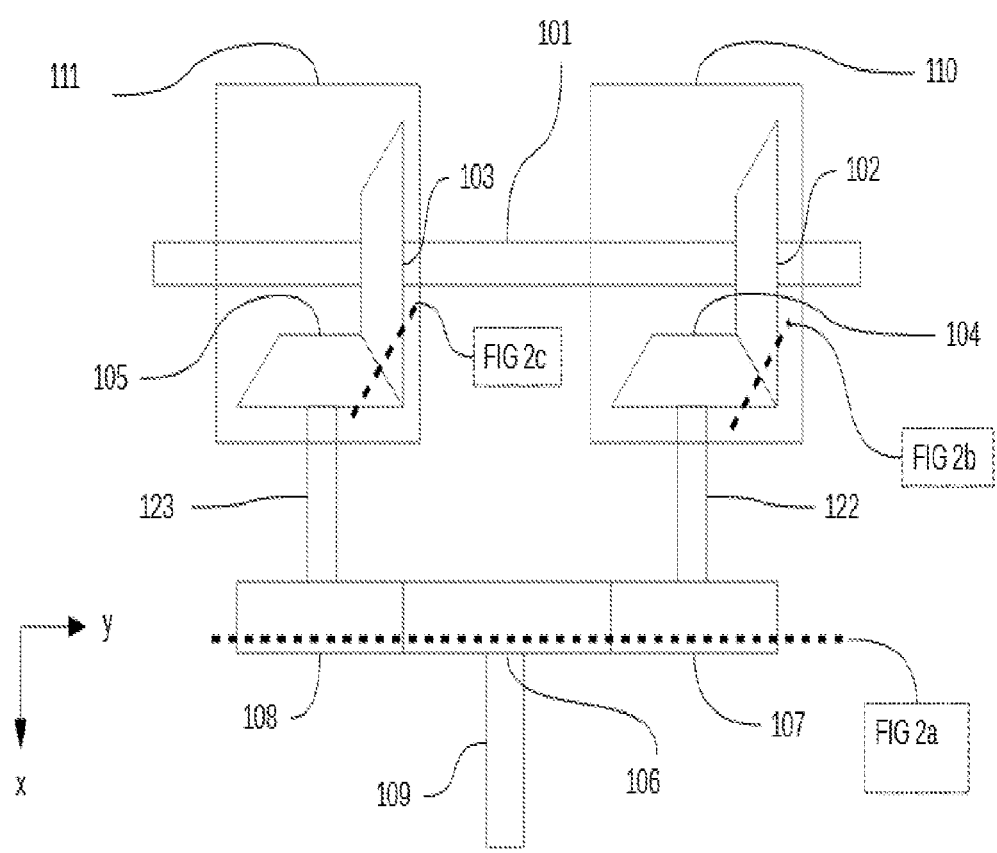
FIG. 1a is a block diagram of the zero backlash right angle transmission system according to a first embodiment of the present application.
Figure 1B:
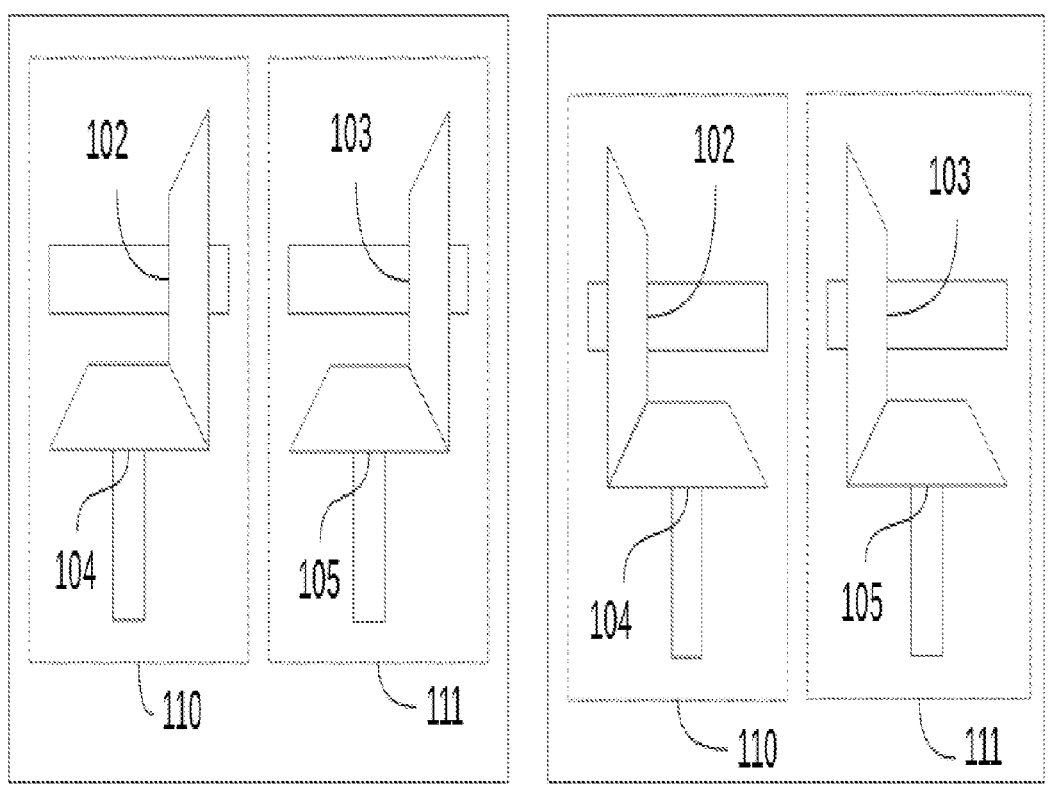
FIG. 1b shows different gear orientation options of the zero backlash right angle transmission system.
Figure 1C:
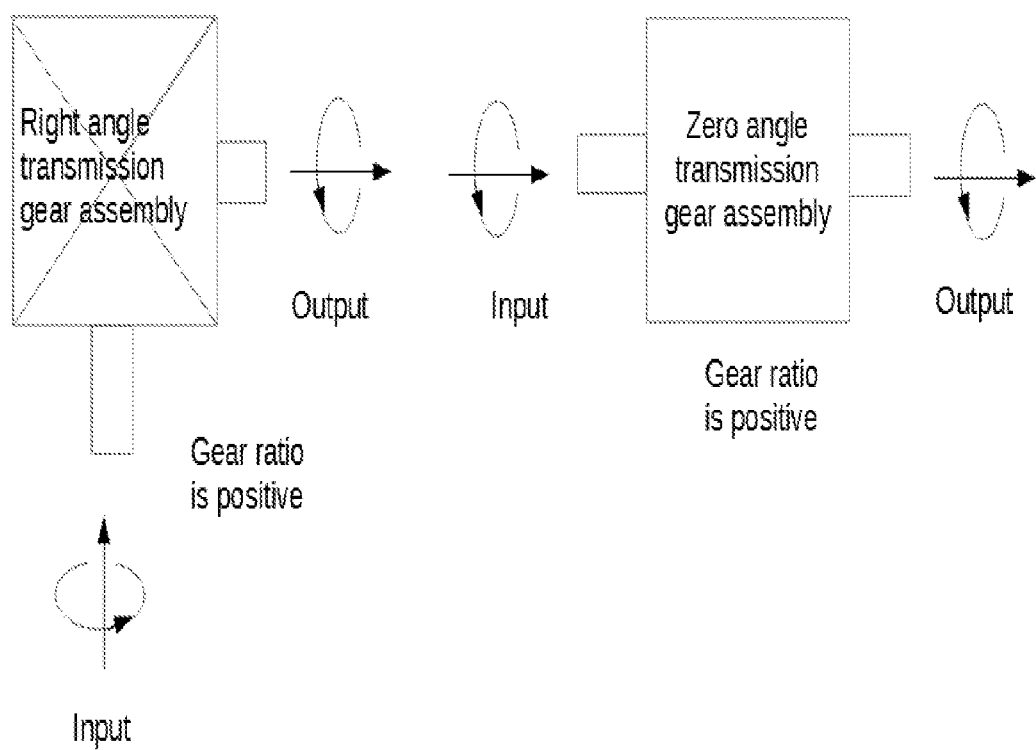
FIG. 1c shows the definition of sign of gear ratio of the zero backlash right angle transmission system.
Figure 1D:
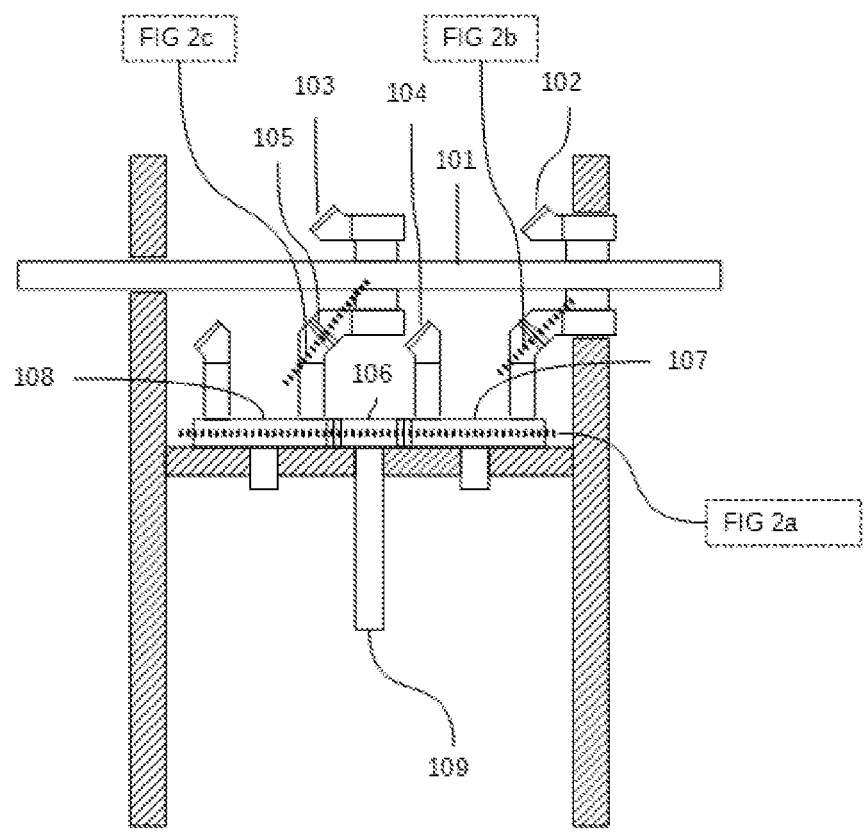
FIG. 1d is a cross sectional view of the zero backlash right angle transmission system according to the first embodiment of the present application.

In one embodiment, according to FIG. 1a and FIG. 1d, the zero backlash right angle transmission system of the present application may include four Bevel gears 102, 103, 104, 105, three spur gears 106, 107, 108, one output shaft 101 and one input shaft 109. Gear 106 is an input gear mounted on the input shaft 109. Gears 107, 108 are drive gears which may be mounted on drive shafts 122, 123 respectively. Gears 104, 105 may also be mounted on the drive shafts 122, 123 respectively.

The output shaft 101 may be fixed to gears 102, 103. Bevel gears 102, 103 may be engaged with Bevel gears 104, 105 respectively in order to turn transmission at right angle.

The gear 104 may be fixed to gear 107. The gear 105 may be fixed to gear 108.

Gears 107, 108 may be engaged with gear 106 which may be fixed to input shaft 109.

Although gears 102, 103, 104, 105 shown in FIG. 1a and FIG. 1d are Bevel gears (FIG. 1f), it is understood that Miter gears (FIG. 1g), crown gears (FIG. 1h), hypoid gears (FIG. 1i), spiral helical gears (FIG. 1j) and any gears providing transmission at right angle can be applied. Similarly, although gears 106, 107, 108 shown in FIG. 1a and FIG. 1d are spur gears (FIG. 1k), it is understood that single helical gears (FIG. 1l), double helical gears (FIG. 1m) and any gears providing transmission at zero angle can be applied.

Two different orientations of Bevel gears 102, 103, 104, 105 are shown in FIG. 1b. It is understood that other orientations may be possible and is not limited to the illustrated ones. The definition of the sign of gear ratio is positive if both the input and output rotational directions are the same, or else negative as shown in FIG. 1c.

In another embodiment, according to FIG. 1a, FIG. 1d, gear train may include gear 106, gear 108, shaft 123, gear 105, gear 103, output shaft 101, gear 102, gear 104, shaft 122, and gear 107 which may couple back to gear 106, thereby forming a closed loop gear train which allows application of preload for backlash elimination.

The selection of the gears 102, 103, 104, 105 106, 107, 108 may not be restrictive but may require to satisfy the result of calculation that starting at any point in the closed loop gear train, the result of multiplication of gear ratio of all gears along the closed loop is equal to a positive one according to the definition of the sign of gear ratio that it is positive if both the input and output rotational directions are the same, or else negative, as shown in FIG. 1c.

In FIG. 1a and FIG. 1d, a method for backlash elimination in a zero backlash right angle transmission system is also disclosed.

During assembly process, gear 104 can be applied with an action torque in one direction and gear 107 can be applied with a reaction torque in another direction. Then, the gear 104 and gear 107 may be fixed to each other after the preload action torque and reaction torque distributed along the closed loop gear train, which can eventually make the spur gears 106, 107, 108, the Bevel gears 102, 104 of the right angle transmission gear assembly 110, and the Bevel gears 103, 105 of the right angle transmission gear assembly 111 being tightly meshed one another so as to have gear backlash eliminated in the closed loop gear train.

The backlash elimination is described in detail as follows (torque indicated by a single solid line arrow → in FIG. 2a, FIG. 2b, and FIG. 2c in which the direction of torque is determined by directions x, y in FIG. 1a and definition of clockwise in FIG. 1e):

The gear 104 is applied with action toque and tends to rotate anti-clockwise about an axis parallel to the x direction.

Figure 2A:
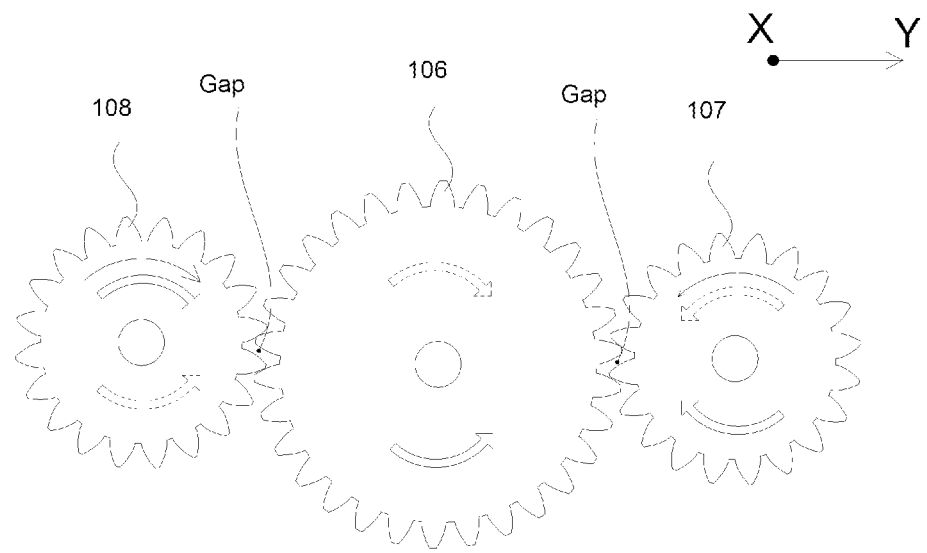
FIG. 2a shows the direction of torque and rotation of the input gears of the zero backlash right angle transmission system.

On the other side, gear 107 is applied with reaction torque clockwise and tends to rotate clockwise about an axis parallel to the x direction, as shown in FIG. 2a.

Because the same action torque and reaction torque are only applied in the closed loop gear train, all gears and shafts slightly rotate until all gears are tightly meshed and finally all gears and shafts in the closed loop train are stationary.

Further details of the transmission of torque throughout the entire closed loop gear train are described below.

Figure 2B:
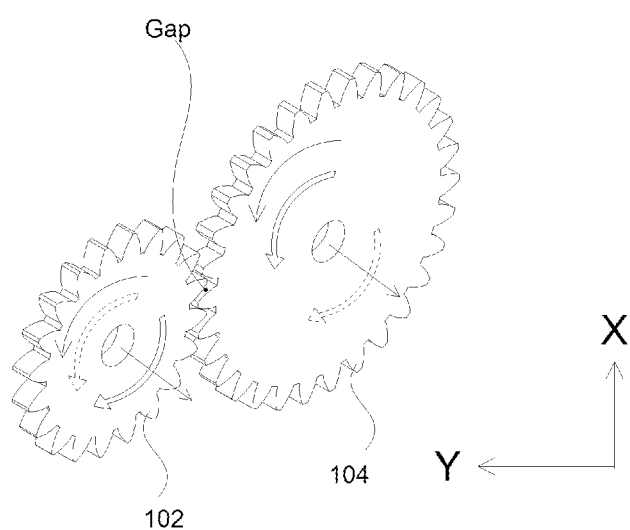
FIG. 2b shows the direction of torque and rotation of a first right angle transmission gear assembly of the zero backlash right angle transmission system.

Gear 102 stops gear 104 to rotate with torque anti-clockwise about an axis parallel to the y direction. Under the torque, there is no gap at one side of each engaged tooth between gear 102 and gear 104, but there is a gap at another side of each engaged tooth, as shown in FIG. 2b.

Gear 103 stops gear 102 to rotate with torque clockwise about an axis parallel to the y direction via the output shaft 101.

Figure 2C:
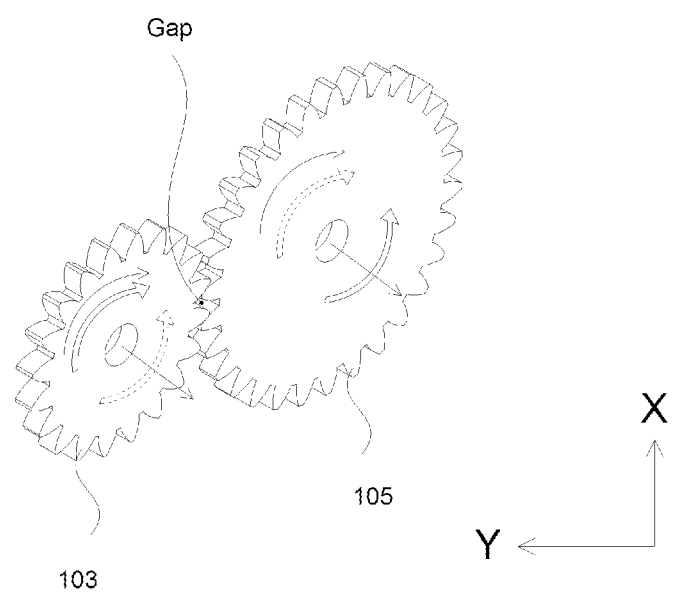
FIG. 2c shows the direction of torque and rotation of a second right angle transmission gear assembly of the zero backlash right angle transmission system.

Gear 105 stops gear 103 to rotate with torque clockwise about an axis parallel to the x direction. Under the torque, there is no gap at one side of each engaged tooth between gear 103 and gear 105, but there is a gap at another side of each engaged tooth, as shown in FIG. 2c.

Gear 108 stops gear 105 to rotate with torque anti-clockwise about an axis parallel to the x direction.

Gear 107 stops gear 108 via gear 106 to rotate with torque clockwise about an axis parallel to the x direction. Under the torque, there is no gap at one side of each engaged tooth between gear 108 and gear 106, as well as each engaged tooth between gear 106 and gear 107, but there is a gap at another side of each engaged tooth, as shown in FIG. 2a.

Through applying preload which distributes along the closed loop gear train, there is no gap at one side of each engaged tooth and thus backlash of the closed loop gear train can be eliminated in whichever direction the external input torque is applied because the closed loop gear train offers two separated gear trains (along which there is no gear gap at each engaged tooth in the driving direction) from input shaft to output shaft.

FIG. 1a and FIG. 1d show an embodiment of forward and backward motions without backlash provided by the closed loop gear train.

After preloading, the input shaft 109 driven by an external torque generates forward and backward rotational motions at the output shaft 101 without backlash. In fact, the external torque drives the whole set of gears and shafts in the closed loop gear train all together in which there is no gear gap at each engaged tooth between gears in the direction of rotational motion as they have already been eliminated during preloading. The details are explained as follows.

Figure 1E:
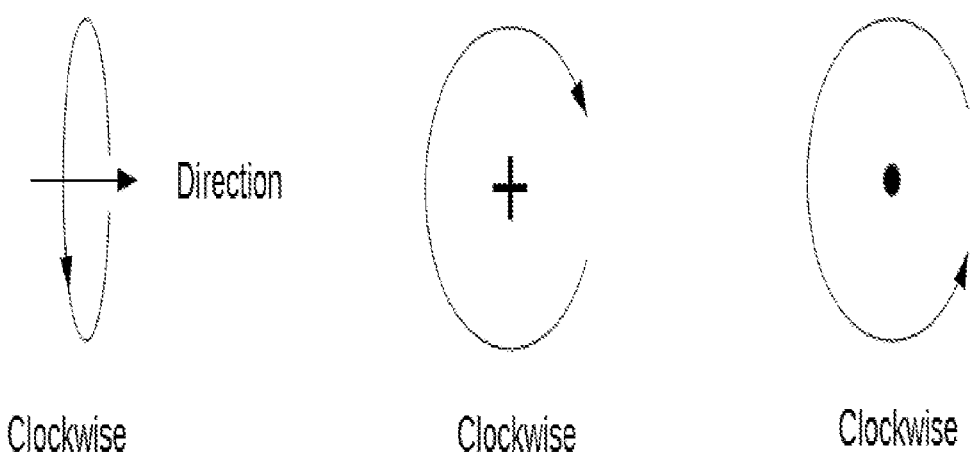
FIG. 1e shows the definition of clockwise rotation of gears of the zero backlash right angle transmission system.
Figure 1F:
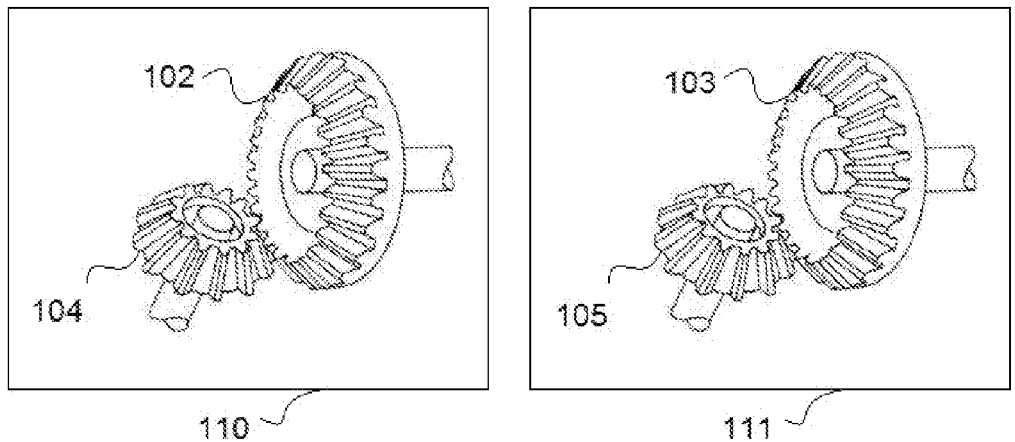
FIGS. 1f-1j show Bevel gears, Miter gears, crown gears, hypoid gears and spiral helical gears of the right angle transmission gear assembly respectively according to various embodiments of the present application.
Figure 1G:
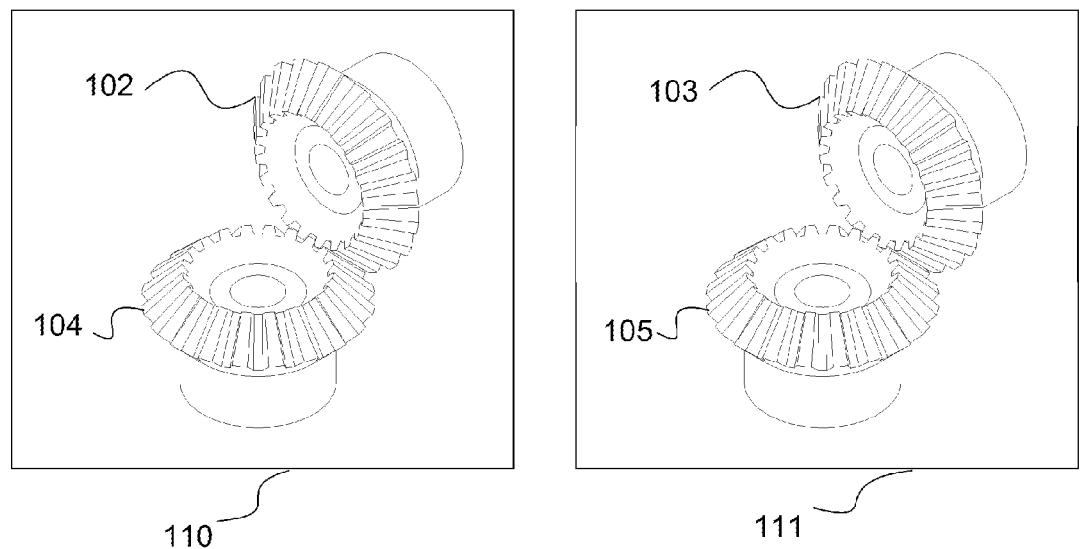
Figure 1H:
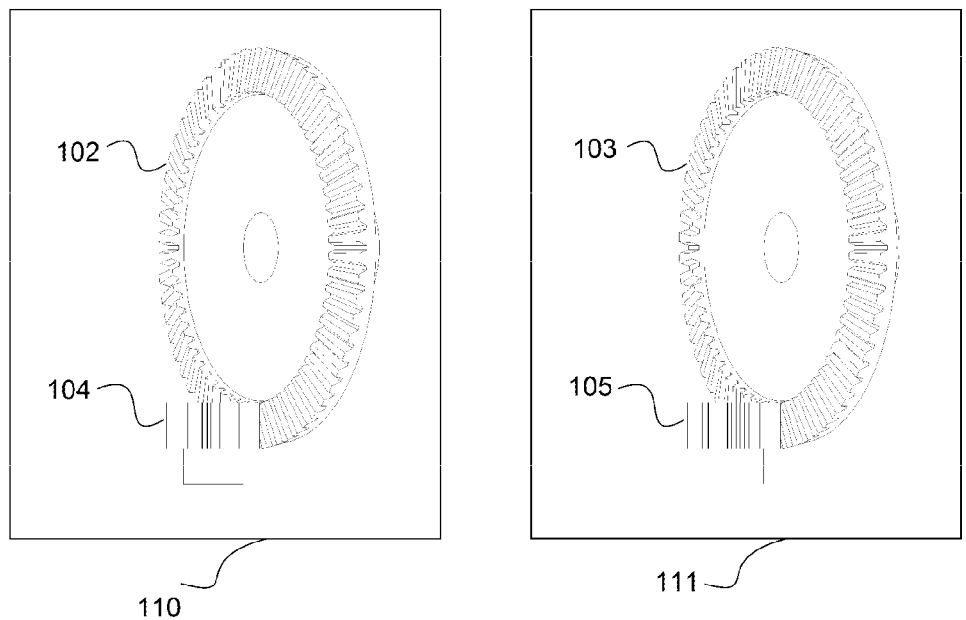
Figure 1I:
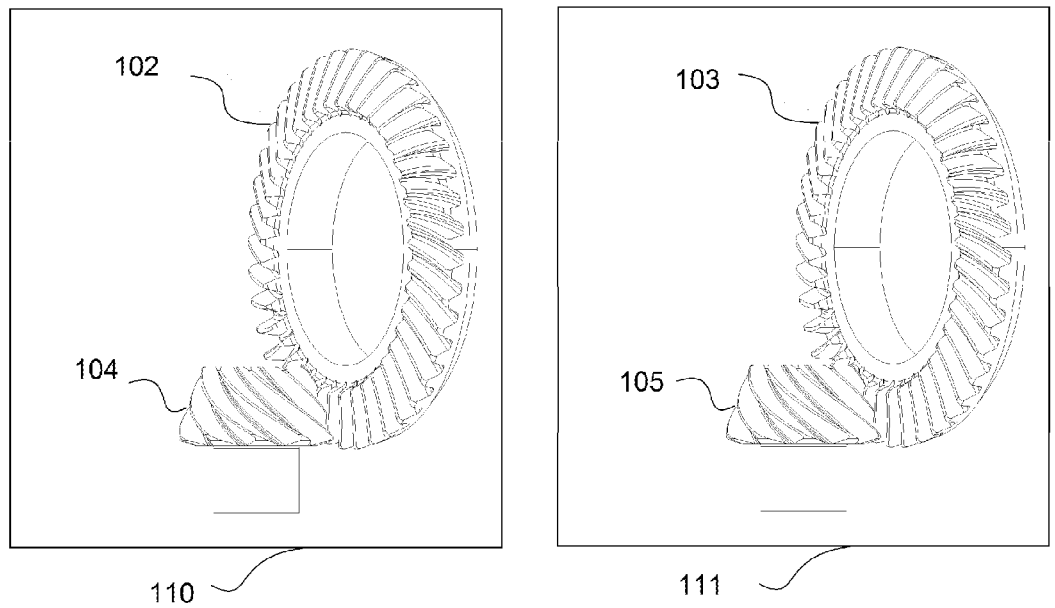
Figure 1J:
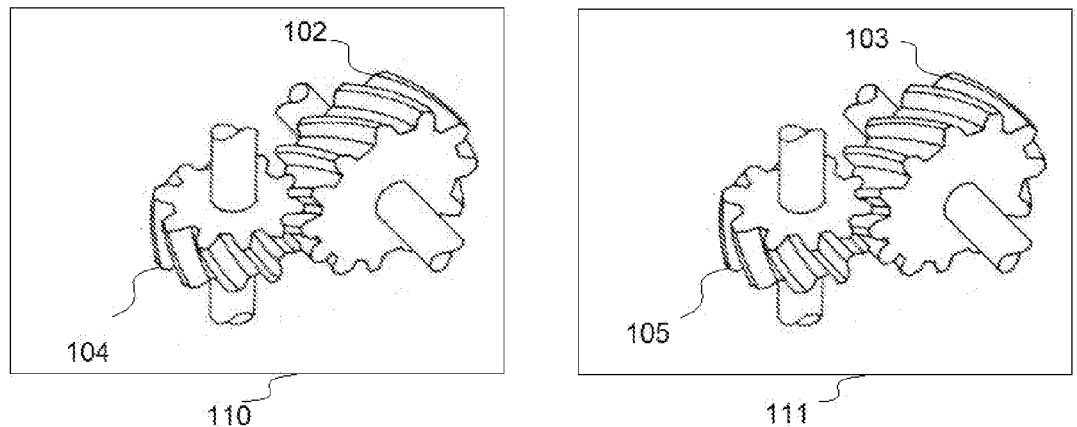
Figure 1K:
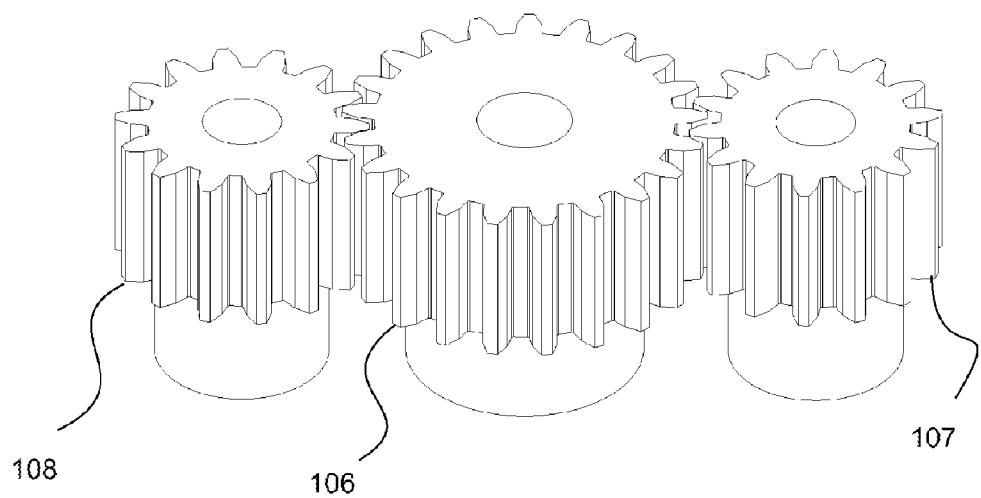
Figure 1I:
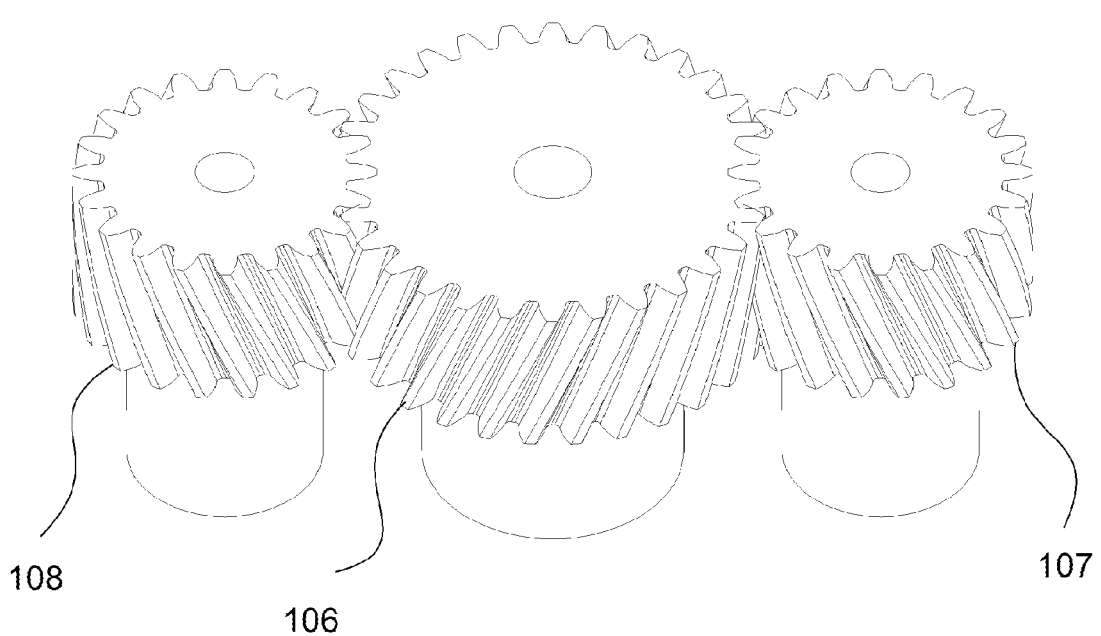
Figure 1M:
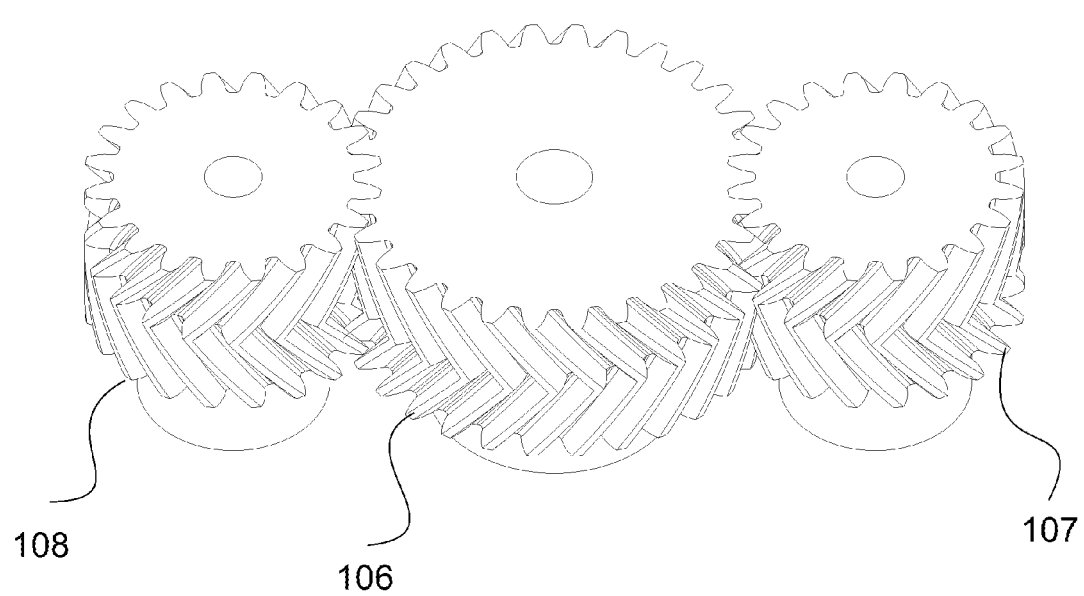

Forward motion (motion indicated by a double dot line arrow $\dashrightarrow$ in FIG. 2a, FIG. 2b, and FIG. 2c in which the direction of motion is determined by directions x, y in FIG. 1a and the definition of clockwise in FIG. 1e):

The input shaft 109 may be driven by an external torque to rotate anti-clockwise about an axis parallel to the x direction.

Gear 108 may be driven by gear 106 clockwise about an axis parallel to the x direction without gear gap at each engaged tooth, as shown in FIG. 2a.

Gear 105 may be driven by gear 108 clockwise about an axis parallel to the x direction.

Gear 103 may be driven by gear 105 anti-clockwise about an axis parallel to the y direction without gear gap at each engaged tooth, as shown in FIG. 2c.

Gear 102 may be driven by gear 103 anti-clockwise about an axis parallel to the y direction via output shaft 101.

Gear 104 may be driven by gear 102 clockwise about an axis parallel to the x direction without gear gap at each engaged tooth, as shown in FIG. 2b.

Gear 107 may be driven by gear 104 clockwise about an axis parallel to the x direction.

Gear 106 may be driven by gear 107 anti-clockwise about an axis parallel to the x direction without gear gap at each engaged tooth, as shown in FIG. 2a.

The closed loop gear train's forward motion is completed. There is no gear gap at each engaged tooth encountered along the forward motion path.

Backward motion (motion indicated by a double solid line arrow ⟹ in FIG. 2a, FIG. 2b, and FIG. 2c in which the direction of motion is determined by directions x, y in FIG. 1a and the definition of clockwise in FIG. 1e):

The input shaft 109 may be driven by an external torque to rotate clockwise about an axis parallel to the x direction.

Gear 107 may be driven by gear 106 anti-clockwise about an axis parallel to the x direction without gear gap at each engaged tooth, as shown in FIG. 2a.

Gear 104 may be driven by gear 107 anti-clockwise about an axis parallel to the x direction. Gear 102 may be driven by gear 104 clockwise about an axis parallel to the y direction without gear gap at each engaged tooth, as shown in FIG. 2b.

Gear 103 may be driven by gear 102 clockwise about an axis parallel to the y direction via output shaft 101.

Gear 105 may be driven by gear 103 anti-clockwise about an axis parallel to the x direction without gear gap at each engaged tooth, as shown in FIG. 2c.

Gear 108 may be driven by gear 105 anti-clockwise about an axis parallel to the x direction.

The closed loop gear train's backward motion is completed. There is no gear gap at each engaged tooth encountered along the backward motion path.

In the present application, there is no backlash in the forward and backward motion directions because there is no gear gap at each engaged tooth for all gears of the closed loop gear train during the forward and backward motions.

Second Embodiment

Figure 3A:
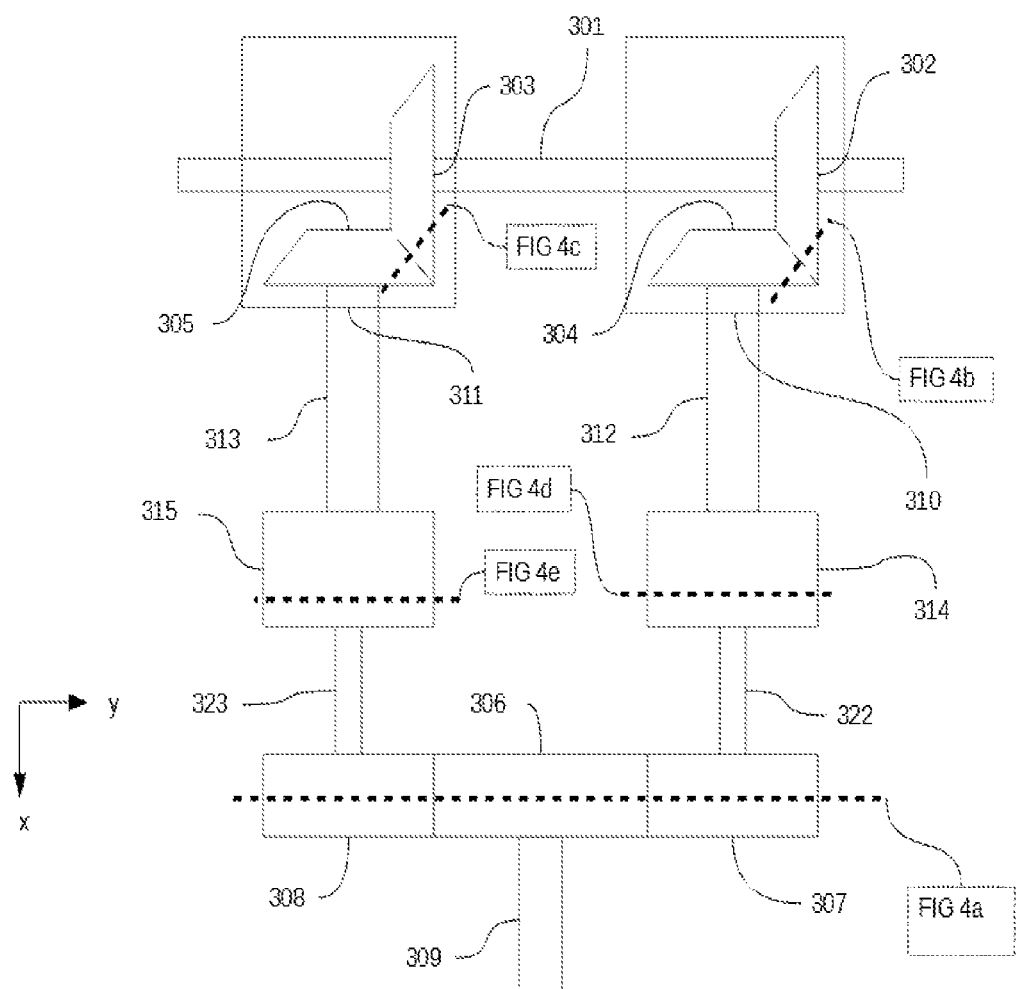
FIG. 3a is a block diagram of the zero backlash right angle transmission system according to a second embodiment of the present application.
Figure 3B:
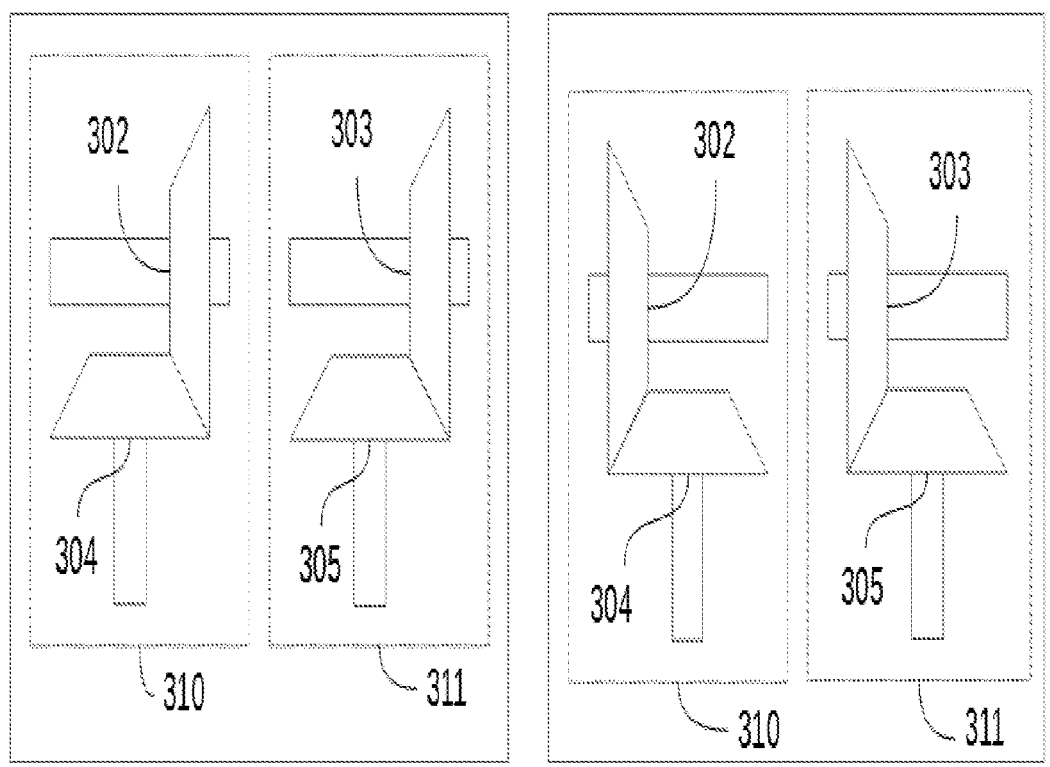
FIG. 3b shows different gear orientation options of the zero backlash right angle transmission system.
Figure 3C:
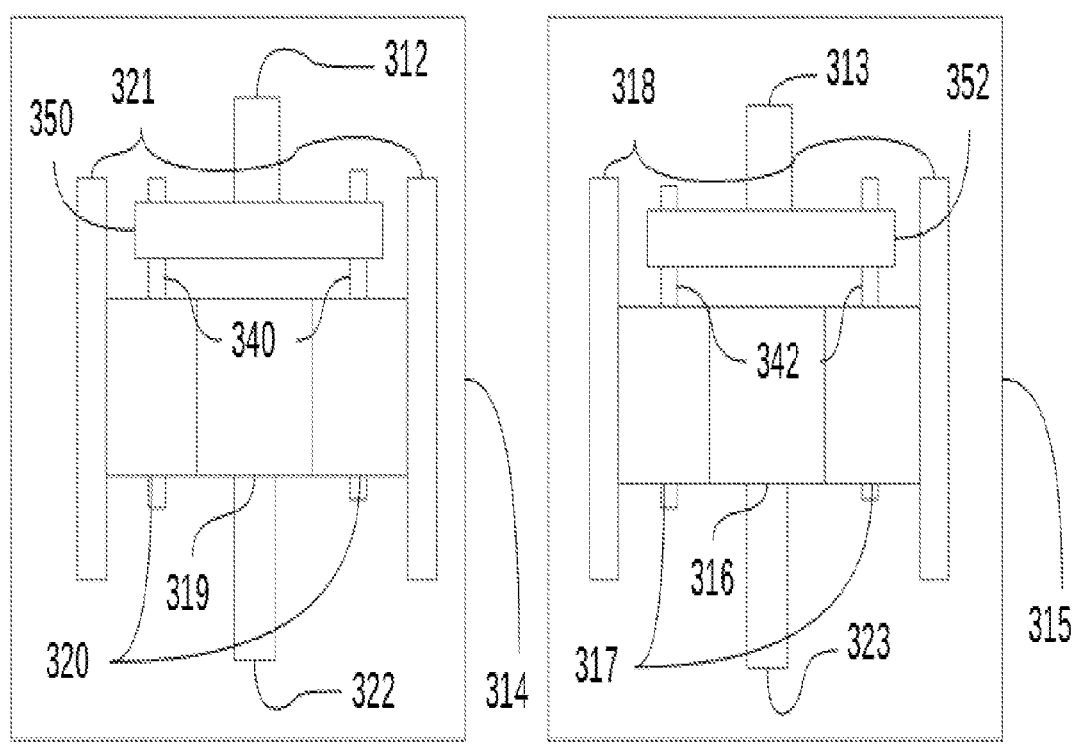
FIG. 3c shows the planetary gear assemblies of the zero backlash right angle transmission system.
Figure 3D:
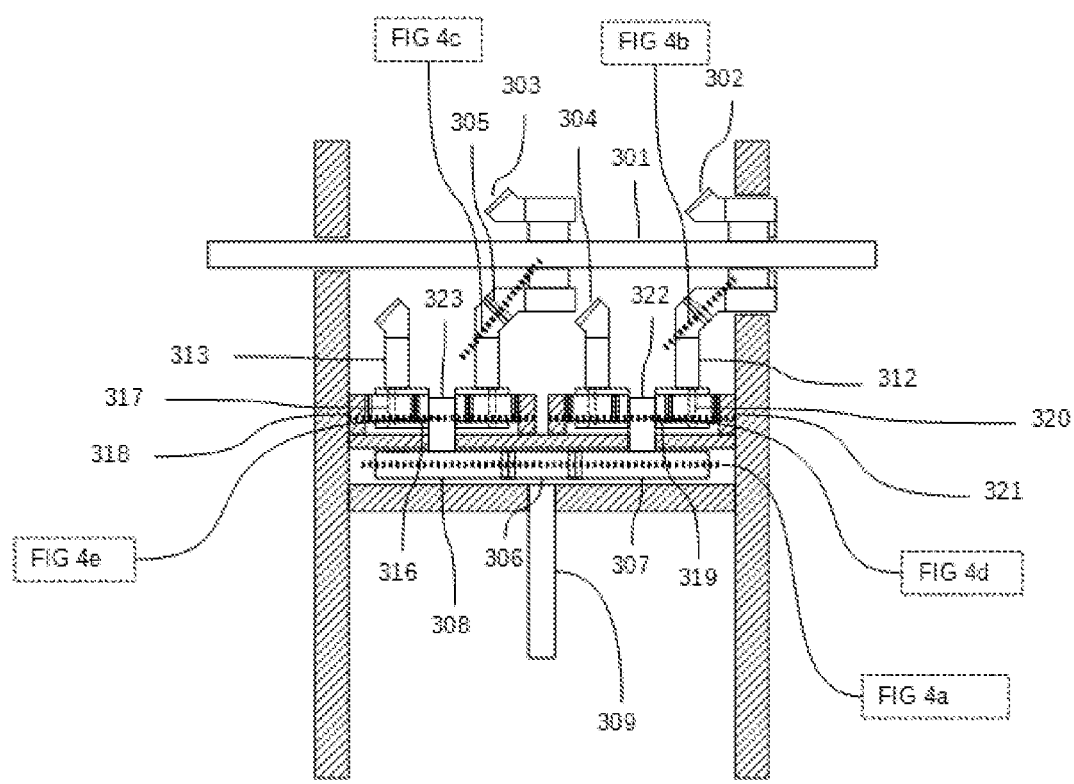
FIG. 3d is a cross sectional view of the zero backlash right angle transmission system according to the second embodiment of the present application.

In another embodiment, according to FIG. 3a, FIG. 3c and FIG. 3d, the zero backlash right angle transmission system may include four Bevel gears 302, 303, 304, 305, two planetary gear assemblies 314, 315, three spur gears 306, 307, 308, one output shaft 301 and one input shaft 309.

The output shaft 301 may be fixed to gears 302, 303. Gears 302, 303 may be engaged with gears 304, 305 respectively in order to turn transmission at right angle.

The gears 304 may be fixed to carrier shaft 312 of planetary gear assembly 314 with its sun shaft 322 being fixed to gear 307.

The gears 305 may be fixed to carrier shaft 313 of planetary gear assembly 315 with its sun shaft 323 being fixed to gear 308.

Gears 307, 308 may be engaged with gear 306 which may be fixed to input shaft 309.

Although gears 302, 303, 304, 305 shown in FIG. 3a and FIG. 3d are Bevel gears (FIG. 1f), it is understood that Miter gears (FIG. 1g), crown gears (FIG. 1h), hypoid gears (FIG. 1i), spiral helical gears (FIG. 1j) and any gears providing transmission at right angle can be applied. Similarly, although gears 306, 307, 308 shown in FIG. 3a and FIG. 3d are spur gears (FIG. 1k), it is understood that single helical gears (FIG. 1l), double helical gears (FIG. 1m) and any gears providing transmission at zero angle can be applied.

Two different orientations of Bevel gears 302, 303, 304, 305 are shown in FIG. 3b. It is understood that other orientations may be possible and is not limited to the illustrated ones. The definition of the sign of gear ratio is positive if both the input and output rotational directions are the same, or else negative as shown in FIG. 1c.

The transmission angle of planetary gear assemblies 314, 315 as shown in FIG. 3c is zero degree. The planetary gear assemblies may be replaced with simple shafts or other zero angle transmission gear assemblies that can be driven in reverse direction. The gear assemblies 314, 315 may have backlash.

In another embodiment, according to FIG. 3a, FIG. 3c, and FIG. 3d, the gear train may include gear 306, gear 308, sun shaft 323, planetary gear assembly 315, carrier shaft 313, gear 305, gear 303, output shaft 301, gear 302, gear 304, carrier shaft 312, planetary gear assembly 314, sun shaft 322, and gear 307 which may be engaged back with gear 306, thereby forming a closed loop gear train.

The selection of the gears 302, 303, 304, 305 306, 307, 308 and gear assemblies 314, 315 may not be restrictive but may require to satisfy the result of calculation that starting at any point in the closed loop gear train, the result of multiplication of gear ratio of all gears and gear assemblies along the closed loop is equal to a positive one according to the definition of the sign of gear ratio that it is positive if both the input and output rotational directions are the same, or else negative, as shown in FIG. 1c.

In FIG. 3a, FIG. 3c, and FIG. 3d, a method for backlash elimination in a zero backlash right angle transmission system is disclosed.

During assembly process, the sun shaft 322 is applied with an action torque in one direction and gear 307 is applied with a reaction torque in another direction. Then, the sun shaft 322 and gear 307 may be fixed to each other after the preload action torque and reaction torque distributed along the closed loop gear train, which can eventually make the spur gears 306, 307, 308, the Bevel gears 302, 304 of the right angle transmission gear assembly 310, the Bevel gears 303, 305 of the right angle transmission gear assembly 311, sun gear 319, planet gears 320 and ring gear 321 of the planetary gear assembly 314, and sun gear 316, planet gears 317 and ring gear 318 of the planetary gear assembly 315 being tightly meshed one another so as to have the gear backlash eliminated in the closed loop gear train.

Planet gears 320 may be mounted on planet shafts 340 which may be carried by carrier 350 mounted on carrier shaft 312. Planet gears 317 may be mounted on planet shafts 342 which may be carried by carrier 352 mounted on carrier shaft 313.

The backlash elimination is described in detail as follows (torque indicated by a single solid line arrow ⟶ in FIG. 4a, FIG. 4b, FIG. 4c, FIG. 4d, and FIG. 4e in which the direction of torque is determined by directions x, y in FIG. 3a and the definition of clockwise in FIG. 1e):

The sun shaft 322 is applied with action toque so that the gear 319 of the planetary gear assembly 314 tends to rotate anti-clockwise about an axis parallel to the x direction.

Figure 4A:
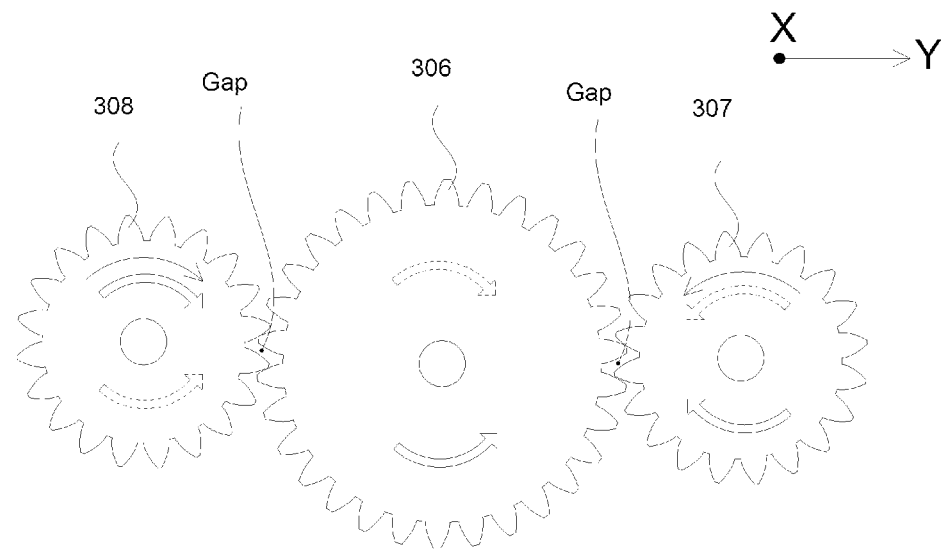
FIG. 4a shows the direction of torque and rotation of the input gears of the zero backlash right angle transmission system.

On the other side, gear 307 is applied with reaction torque clockwise and tends to rotate clockwise about an axis parallel to the x direction, as shown in FIG. 4a.

Because the same action torque and reaction torque are only applied in the closed loop gear train, all gears and shafts slightly rotate until all gears are tightly meshed and finally all gears and shafts in the closed loop train are stationary.

Further details of the transmission of torque throughout the entire closed loop gear train are described below.

Figure 4B:
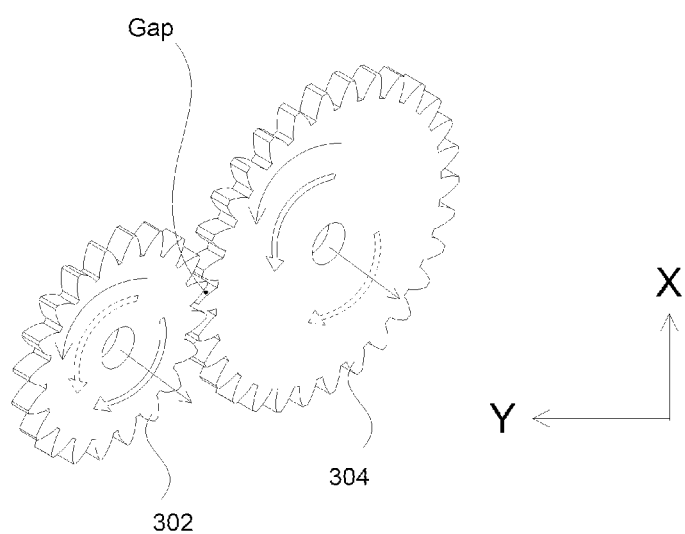
FIG. 4b shows the direction of torque and rotation of a first right angle transmission gear assembly of the zero backlash right angle transmission system.
Figure 4C:
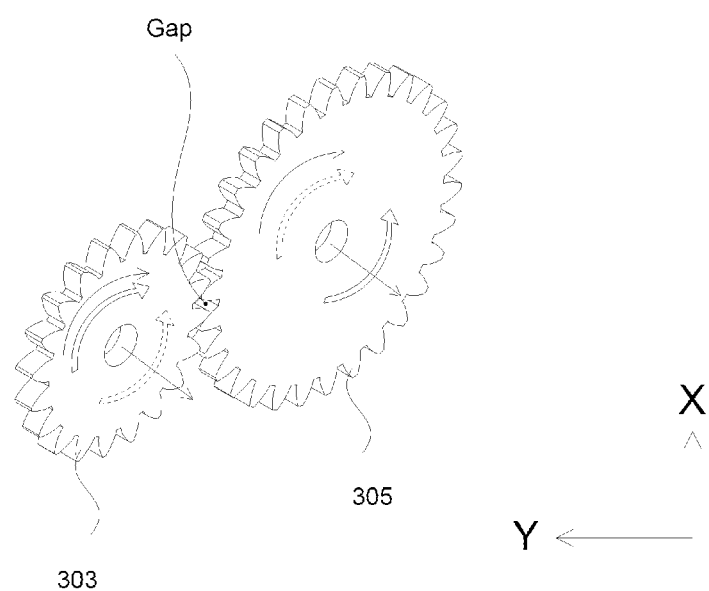
FIG. 4c shows the direction of torque and rotation of a second right angle transmission gear assembly of the zero backlash right angle transmission system.
Figure 4D:
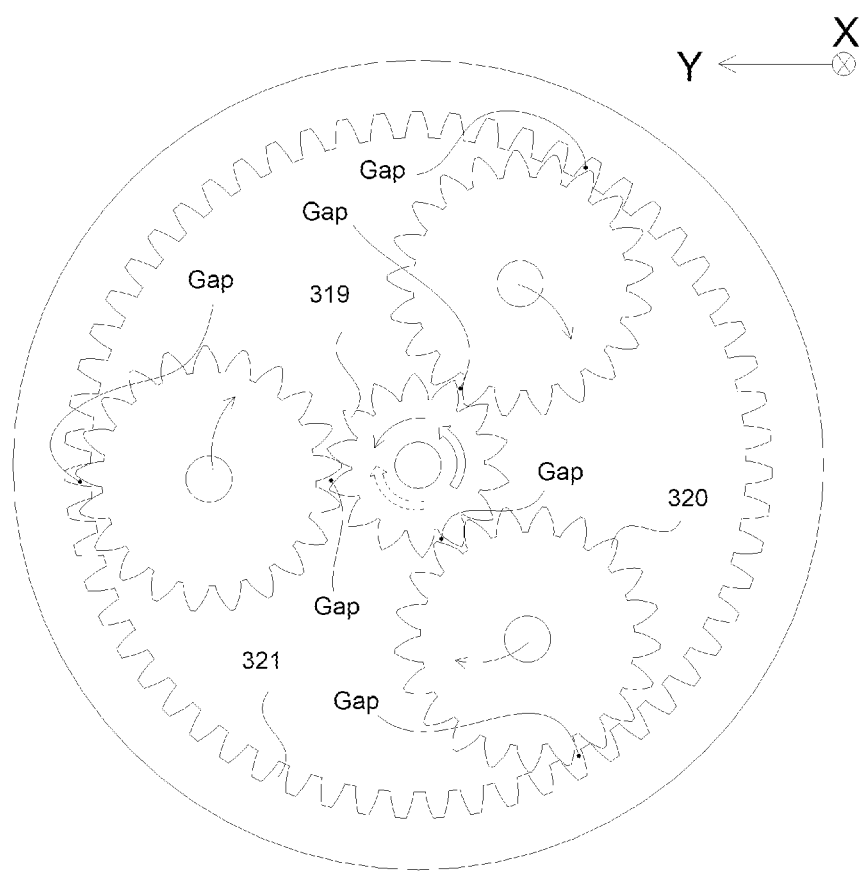
FIG. 4d shows the direction of torque and rotation of a first planetary gear assembly of the zero backlash right angle transmission system.

Gear 304 stops sun shaft 322 to rotate with torque anti-clockwise via carrier shaft 312 and planetary gear assembly 314. Under the torque, there is no gap at one side of each engaged tooth between gear 319 and gear 320, as well as each engaged tooth between gear 320 and gear 321, but there is a gap at another side of each engaged tooth, as shown in FIG. 4d.

Gear 302 stops gear 304 to rotate with torque anti-clockwise about an axis parallel to the y direction. Under the torque, there is no gap at one side of each engaged tooth between gear 302 and gear 304, but there is a gap at another side of each engaged tooth, as shown in FIG. 4b.

Gear 303 stops gear 302 to rotate with torque clockwise about an axis parallel to the y direction via the output shaft 301.

Gear 305 stops gear 303 to rotate with torque clockwise about an axis parallel to the x direction. Under the torque, there is no gap at one side of each engaged tooth between gear 303 and gear 305, but there is a gap at another side of each engaged tooth, as shown in FIG. 4c.

Figure 4E:
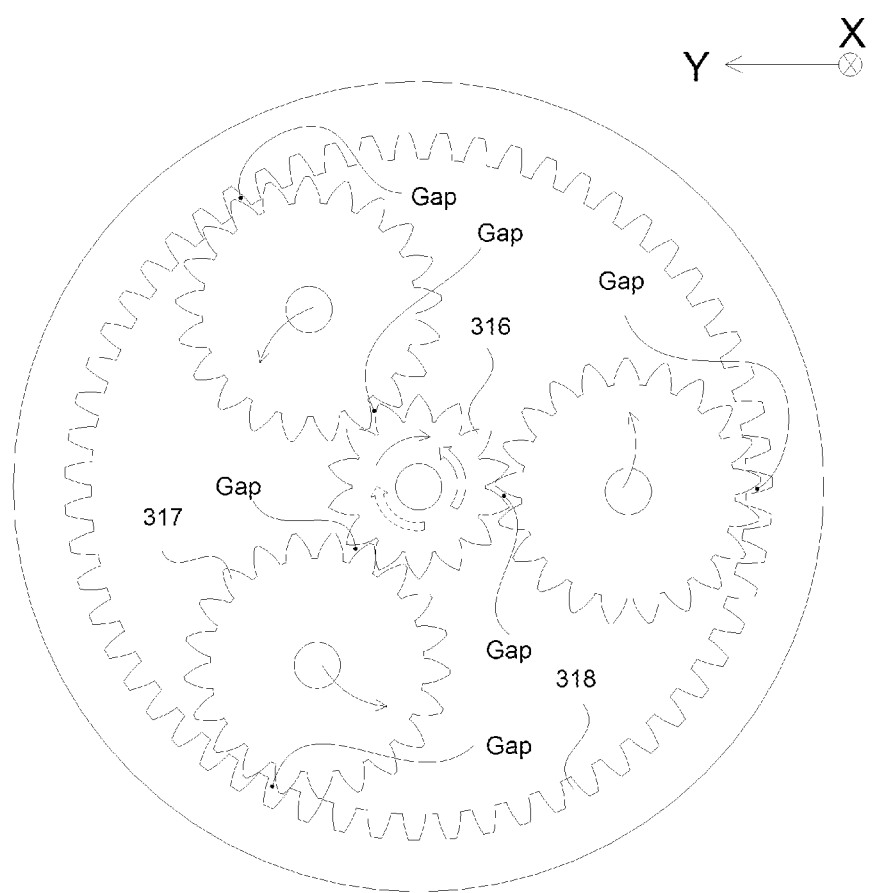
FIG. 4e shows the direction of torque and rotation of a second planetary gear assembly of the zero backlash right angle transmission system.

Gear 308 stops gear 305 to rotate with torque anti-clockwise about an axis parallel to the x direction via the sun shaft 323, planetary gear assembly 315 and carrier shaft 313. Under the torque, there is no gap at one side of each engaged tooth between gear 316 and gear 317, as well as each engaged tooth between gear 317 and gear 318, but there is a gap at another side of each engaged tooth, as shown in FIG. 4e.

Gear 307 stops gear 308 via gear 306 to rotate with torque clockwise about an axis parallel to the x direction. Under the torque, there is no gap at one side of each engaged tooth between gear 308 and gear 306, as well as each engaged tooth between gear 306 and gear 307, but there is a gap at another side of each engaged tooth, as shown in FIG. 4a.

Through applying preload which distributes along the closed loop gear train, there is no gap at one side of each engaged tooth and thus backlash of the closed loop gear train can be eliminated in whichever direction the external input torque is applied because the closed loop gear train offers two separated gear trains (along which there is no gear gap at each engaged tooth in the driving direction) from input shaft to output shaft.

FIG. 3a, FIG. 3c, and FIG. 3d show an embodiment of forward and backward motions without backlash provided by the closed loop gear train.

After preloading, the input shaft 309 driven by an external torque generates forward and backward rotational motions at the output shaft 301 without backlash. In fact, the external torque drives the whole set of gears and shafts in the closed loop gear train all together in which there is no gear gap at each engaged tooth between gears in the direction of rotational motion as they have already been eliminated during preloading. The details are explained as follows:

Forward motion (motion indicated by a double dot line arrow ⇢ in FIG. 4a, FIG. 4b, FIG. 4c, FIG. 4d, and FIG. 4e in which the direction of motion is determined by directions x, y in FIG. 3a and the definition of clockwise in FIG. 1e):

The input shaft 309 may be driven by an external torque to rotate anti-clockwise about an axis parallel to the x direction. Gear 308 may be driven by gear 306 clockwise about an axis parallel to the x direction without gear gap at each engaged tooth, as shown in FIG. 4a.

Gear 305 may be driven clockwise about an axis parallel to the x direction via sun shaft 323, planetary gear assembly 315 and carrier shaft 313. In the planetary gear assembly 315, gear 317 may be driven by gear 316 anti-clockwise about an axis parallel to the x direction without gear gap at each engaged tooth, as shown in FIG. 4e.

Gear 303 may be driven by gear 305 anti-clockwise about an axis parallel to the y direction without gear gap at each engaged tooth, as shown in FIG. 4c.

Gear 302 may be driven by gear 303 anti-clockwise about an axis parallel to the y direction via output shaft 301.

Gear 304 may be driven by gear 302 clockwise about an axis parallel to the x direction without gear gap at each engaged tooth, as shown in FIG. 4b.

Gear 307 may be driven by gear 304 clockwise via carrier shaft 312, planetary gear assembly 314 and sun shaft 322. In the planetary gear assembly 314, gear 319 may be driven by gear 320 clockwise about an axis parallel to the x direction without gear gap at each engaged tooth, as shown in FIG. 4d.

Gear 306 may be driven by gear 307 anti-clockwise about an axis parallel to the x direction without gear gap at each engaged tooth, as shown in FIG. 4a.

The closed loop gear train's forward motion is completed. There is no gear gap at each engaged tooth encountered along the forward motion path.

Backward motion (motion indicated by a double solid line arrow ⟹ in FIG. 4a, FIG. 4b, FIG. 4c, FIG. 4d, and FIG. 4e in which the direction of motion is determined by directions x, y in FIG. 3a and the definition of clockwise in FIG. 1e):

The input shaft 309 may be driven by an external torque to rotate clockwise about an axis parallel to the x direction. Gear 307 may be driven by gear 306 anti-clockwise about an axis parallel to the x direction without gear gap at each engaged tooth, as shown in FIG. 4a.

Gear 304 may be driven by gear 307 anti-clockwise about an axis parallel to the x direction via sun shaft 322, planetary gear assembly 314 and carrier shaft 312. In the planetary gear assembly 314, gear 320 may be driven by gear 319 clockwise about an axis parallel to the x direction without gear gap at each engaged tooth, as shown in FIG. 4d. Gear 302 may be driven by gear 304 clockwise about an axis parallel to the y direction without gear gap at each engaged tooth, as shown in FIG. 4b.

Gear 303 may be driven by gear 302 clockwise about an axis parallel to the y direction via output shaft 301.

Gear 305 may be driven by gear 303 anti-clockwise about an axis parallel to the x direction without gear gap at each engaged tooth, as shown in FIG. 4c.

Gear 308 may be driven by gear 305 anti-clockwise about an axis parallel to the x direction via carrier shaft 313, planetary gear assembly 315 and sun shaft 323. In the planetary gear assembly 315, gear 316 may be driven by gear 317 anti-clockwise about an axis parallel to the x direction without gear gap at each engaged tooth, as shown in FIG. 4e.

The closed loop gear train's backward motion is completed. There is no gear gap at each engaged tooth encountered along the backward motion path.

In the present application, there is no backlash in the forward and backward motion directions because there is no gear gap at each engaged tooth for all gears of the closed loop gear train during the forward and backward motions.

Third Embodiment

Figure 5A:
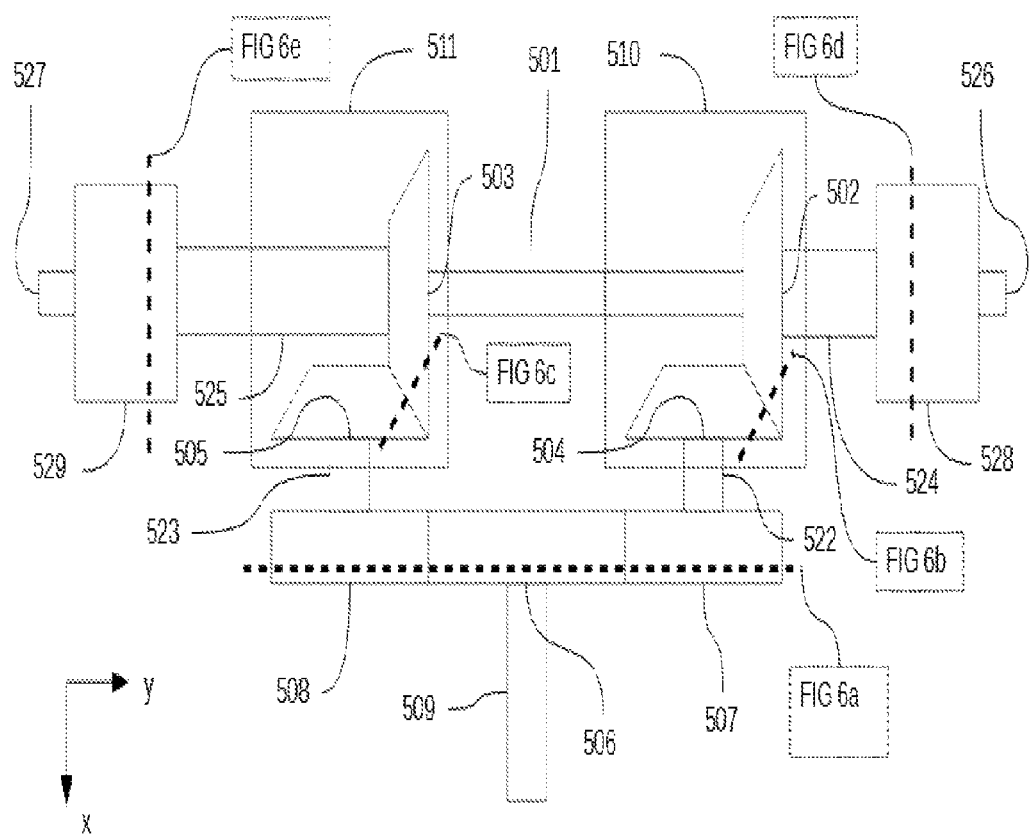
FIG. 5a is a block diagram of the zero backlash right angle transmission system according to a third embodiment of the present application.
Figure 5B:
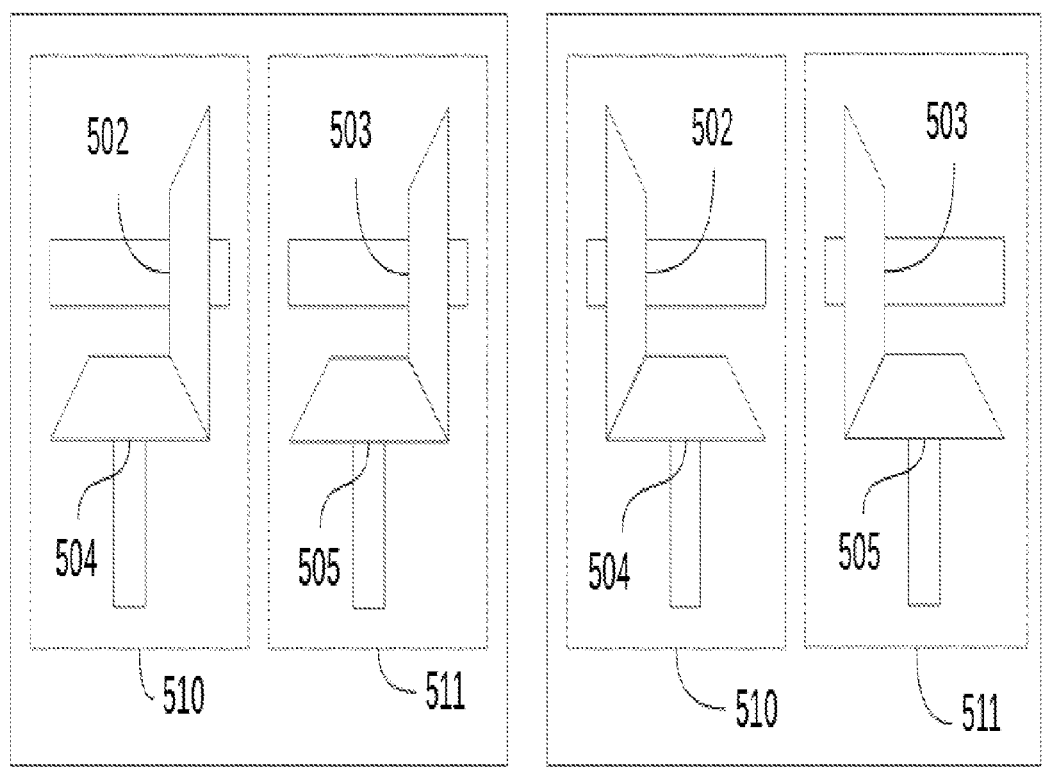
FIG. 5b shows different gear orientation options of the zero backlash right angle transmission system.
Figure 5C:
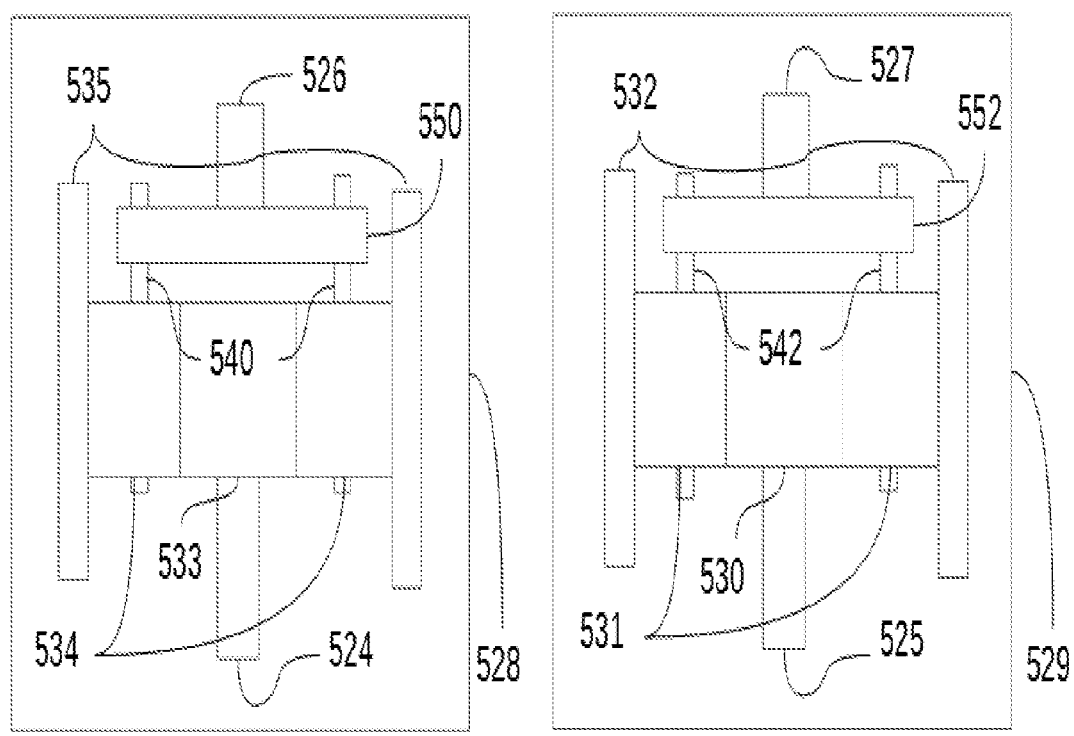
FIG. 5c shows the planetary gear assemblies of the zero backlash right angle transmission system.
Figure 5D:
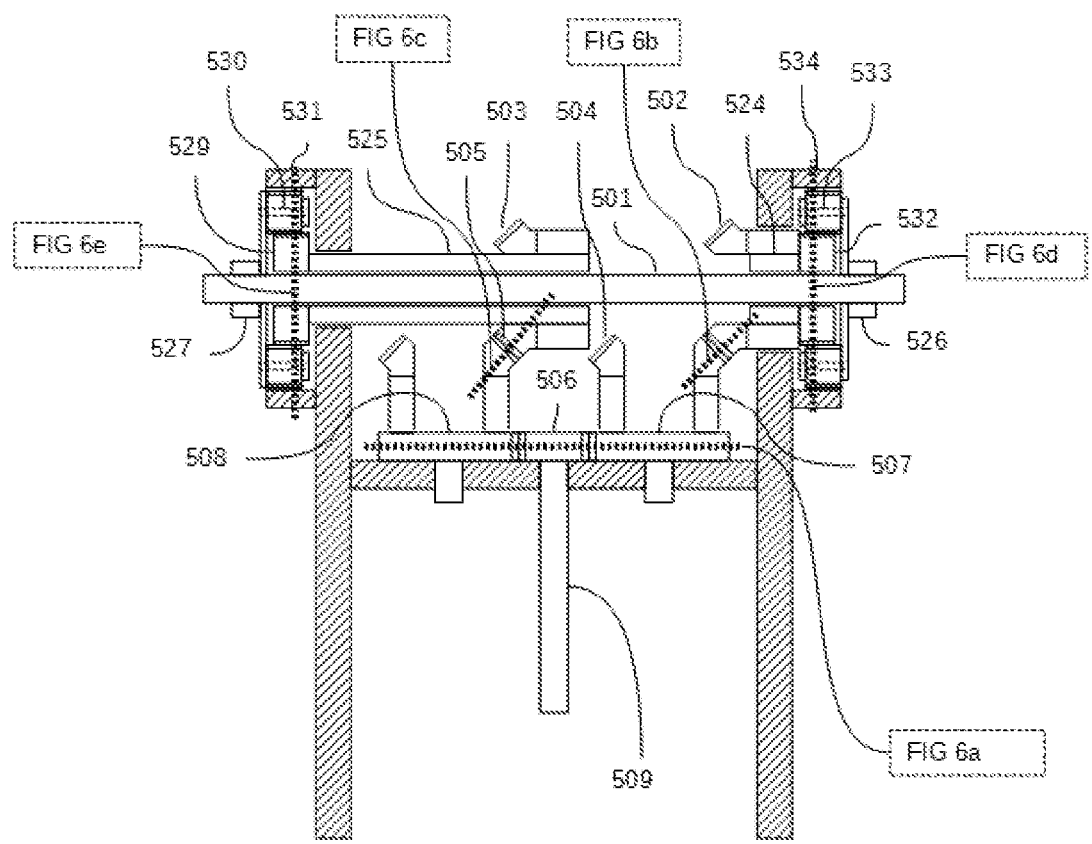
FIG. 5d is a cross sectional view of the zero backlash right angle transmission system according to the third embodiment of the present application.

In another embodiment, according to FIG. 5a, FIG. 5c, and FIG. 5d, the zero backlash right angle transmission system may include four Bevel gears 502, 503, 504, 505, two planetary gear assemblies 528, 529, three spur gears 506, 507, 508, one output shaft 501 and one input shaft 509.

The output shaft 501 may be fixed to hollow carrier shafts 526, 527 of planetary gear assemblies 528, 529 through the center of hollow sun shafts 524, 525 of planetary gear assemblies 528, 529 respectively. The sun shafts 524, 525 may be fixed to gears 502, 503 respectively. Sun gears 533, 530 may be mounted on the hollow sun shafts 524, 525 respectively coupled with the other ones of the gears 502, 503 which may be sleeved around the output shaft 501. Gears 502, 503 may be engaged with gears 504, 505 respectively in order to turn transmission at right angle.

The gears 504 may be fixed to gear 507. The gears 505 may be fixed to gear 508.

Gears 507, 508 may be engaged with gear 506 which may be fixed to input shaft 509.

Although gears 502, 503, 504, 505 shown in FIG. 5a and FIG. 5d are Bevel gears (FIG. 1f), it is understood that Miter gears (FIG. 1g), crown gears (FIG. 1h), hypoid gears (FIG. 1i), spiral helical gears (FIG. 1j) and any gears providing transmission at right angle can be applied. Similarly, although gears 506, 507, 508 shown in FIG. 5a and FIG. 5d are spur gears (FIG. 1k), it is understood that single helical gears (FIG. 1l), double helical gears (FIG. 1m) and any gears providing transmission at zero angle can be applied.

Two different orientations of the Bevel gears 502, 503, 504, 505 are shown in FIG. 5b. It is understood that other orientations may be possible and is not limited to the illustrated ones. The definition of the sign of gear ratio is positive if both the input and output rotational directions are the same, or else negative as shown in FIG. 1c.

The transmission angle of planetary gear assemblies 528, 529 as shown in FIG. 5c is zero degree. The gear assemblies may be replaced with simple shafts or other zero angle transmission gear assemblies that can be driven in reverse direction. The gear assemblies 528, 529 may have backlash.

In another embodiment, according to FIG. 5a, FIG. 5c, and FIG. 5d, gear train may include gear 506, gear 508, gear 505, gear 503, sun shaft 525, planetary gear assembly 529, carrier shaft 527, output shaft 501, carrier shaft 526, planetary gear assembly 528, sun shaft 524, gear 502, gear 504, and gear 507 which may be engaged back with gear 506, thereby forming a closed loop gear train.

The selection of the gears 502, 503, 504, 505, 506, 507, 508 and gear assemblies 528, 529 may not be restrictive but may require to satisfy the result of calculation that starting at any point in the closed loop gear train, the result of multiplication of the gear ratio of all gears and gear assemblies along the closed loop is equal to a positive one according to the definition of the sign of gear ratio that it is positive if both input and output rotational directions are same, or else negative, as shown in FIG. 1c.

FIG. 5a, FIG. 5c, and FIG. 5d also show a method for backlash elimination in a zero backlash right angle transmission system.

During assembly process, the gear 504 is applied with an action torque in one direction and gear 507 is applied with a reaction torque in other direction. Then, the gear 504 and gear 507 may be fixed to each other after the preload action torque and reaction torque distributed along the closed loop gear train, which can eventually make the spur gears 506, 507, 508, the Bevel gears 502, 504 of the right angle transmission gear assembly 510, the Bevel gears 503, 505 of the right angle transmission gear assembly 511, sun gear 533, planet gears 534 and ring gear 535 of planetary gear assembly 528, and sun gear 530, planet gears 531 and ring gear 532 of planetary gear assembly 529 being tightly meshed one another so as to have gear backlash eliminated in the closed loop gear train.

Planet gears 534 may be mounted on planet shafts 540 which may be carried by carrier 550 mounted on hollow carrier shaft 526 sleeved around the output shaft 501. Planet gears 531 may be mounted on planet shafts 542 which may be carried by carrier 552 mounted on hollow carrier shaft 527 sleeved around the output shaft 501.

The backlash elimination is described in detail as follows (torque indicated by a single solid line arrow → in FIG. 6a, FIG. 6b, FIG. 6c, FIG. 6d, and FIG. 6e in which the direction of torque is determined by directions x, y in FIG. 5a and the definition of clockwise in FIG. 1e):

The gear 504 is applied with action toque and tends to rotate anti-clockwise about an axis parallel to the x direction.

Figure 6A:
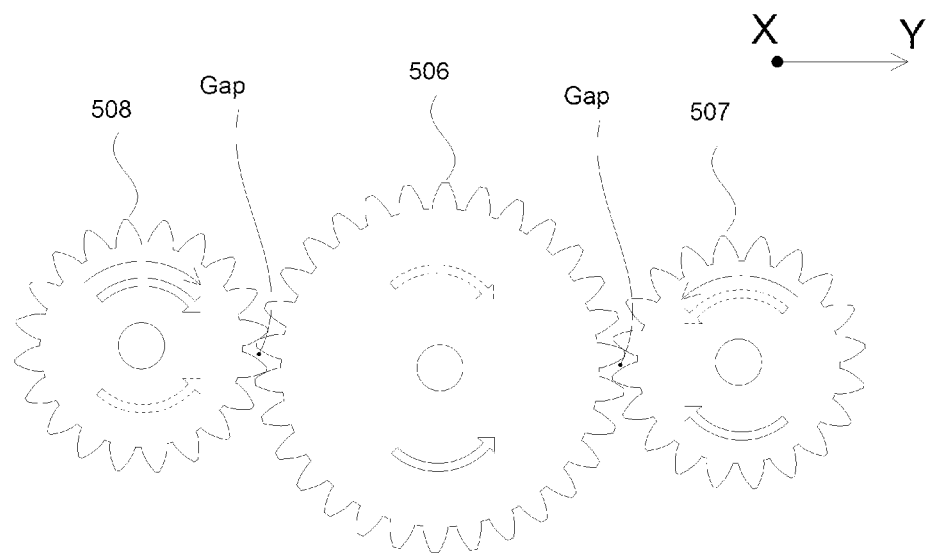
FIG. 6a shows the direction of torque and rotation of the input gears of the zero backlash right angle transmission system.

On the other side, gear 507 is applied with reaction torque clockwise and tends to rotate clockwise about an axis parallel to the x direction, as shown in FIG. 6a.

Because the same action torque and reaction torque are only applied in the closed loop gear train, all gears and shafts slightly rotate until all gears are tightly meshed and finally all gears and shafts in the closed loop train are stationary.

More details for the transmission of torque throughout the entire closed loop gear train are described below.

Figure 6B:
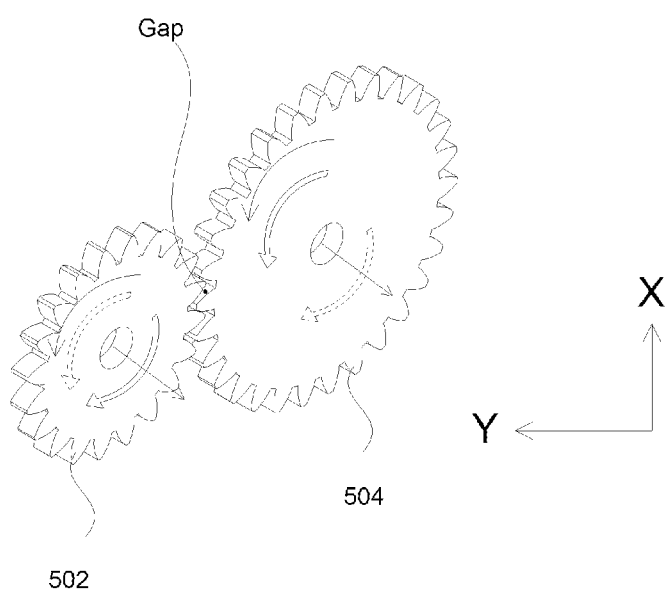
FIG. 6b shows the direction of torque and rotation of a first right angle transmission gear assembly of the zero backlash right angle transmission system.

Gear 502 stops gear 504 to rotate with torque anti-clockwise about an axis parallel to the y direction. Under the torque, there is no gap at one side of each engaged tooth between gear 502 and gear 504, but there is a gap at another side of each engaged tooth, as shown in FIG. 6b.

Figure 6C:
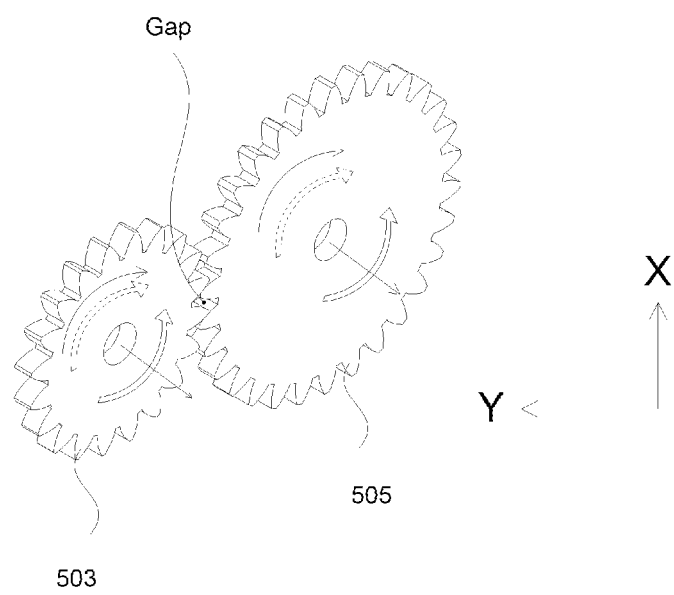
FIG. 6c shows that direction of torque and rotation of a second right angle transmission gear assembly of the zero backlash right angle transmission system.
Figure 6D:
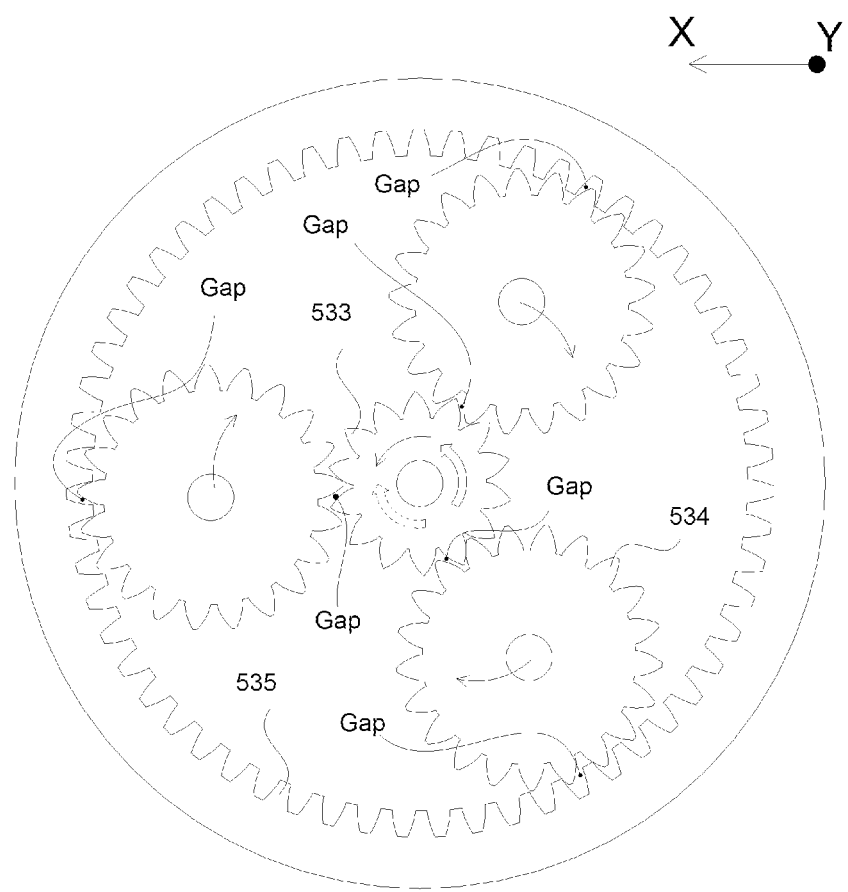
FIG. 6d shows the direction of torque and rotation of a first planetary gear assembly of the zero backlash right angle transmission system.
Figure 6E:
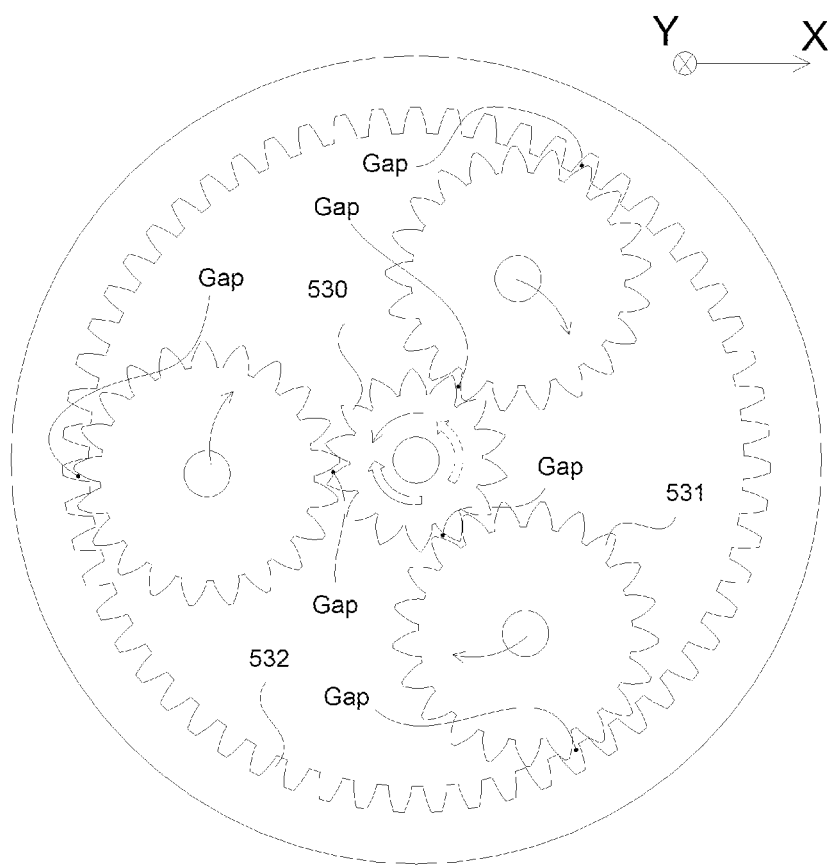
FIG. 6e shows the direction of torque and rotation of a second planetary gear assembly of the zero backlash right angle transmission system.

Gear 503 stops gear 502 to rotate with torque clockwise about an axis parallel to the y direction via the output shaft 501, sun shafts 524, 525, carrier shafts 526, 527 and planetary assemblies 528, 529 respectively. Under the torque, there is no gap at one side of each engaged tooth between gear 533 and gear 534, as well as each engaged tooth between gear 534 and gear 535 and there is a gap at another side of each engaged tooth, as shown in FIG. 6d. Also there is no gap at one side of each engaged tooth between gear 530 and gear 531, as well as each engaged tooth between gear 531 and gear 532, but there is a gap at another side of each engaged tooth, as shown in FIG. 6e.

Gear 505 stops gear 503 to rotate with torque clockwise about an axis parallel to the x direction. There is no gap at one side of each engaged tooth between gear 503 and gear 505, but there is a gap at another side of each engaged tooth, as shown in FIG. 6c.

Gear 508 stops gear 505 to rotate with torque anti-clockwise about an axis parallel to the x direction.

Gear 507 stops gear 508 via gear 506 to rotate with torque clockwise about an axis parallel to the x direction. There is no gap at one side of each engaged tooth between gear 508 and gear 506, as well as each engaged tooth between gear 506 and gear 507, but there is a gap at another side of each engaged tooth, as shown in FIG. 6a.

Through applying preload which distributes along the closed loop gear train, there is no gap at one side of each engaged tooth of the gears and thus backlash of the closed loop gear train can be eliminated in whichever direction the external input torque is applied because the closed loop gear train offers two separated gear trains (along which there is no gear gap at each engaged tooth in the driving direction) from input shaft to output shaft.

FIG. 5a and FIG. 5d show an embodiment of forward and backward motions without backlash provided by the closed loop gear train.

After preloading, the input shaft 509 driven by external torque generates forward and backward rotational motions at the output shaft 501 without backlash. In fact, the external torque drives the whole set of gears and shafts in the closed loop gear train all together in which there is no gear gap at each engaged tooth between gears in the direction of rotational motion as they have already been eliminated during preloading. The details are explained as follows:

Forward motion (motion indicated by a double dot line arrow ┄┄▶ in FIG. 6a, FIG. 6b, FIG. 6c, FIG. 6d, and FIG. 6e in which the direction of motion is determined by directions x, y in FIG. 5a and the definition of clockwise in FIG. 1e):

The input shaft 509 may be driven by an external torque to rotate anti-clockwise about an axis parallel to the x direction. Gear 508 may be driven by gear 506 clockwise about an axis parallel to the x direction without gear gap at each engaged tooth, as shown in FIG. 6a.

Gear 505 may be driven by gear 508 clockwise about an axis parallel to the x direction.

Gear 503 may be driven by gear 505 anti-clockwise about an axis parallel to the y direction without gear gap at each engaged tooth, as shown in FIG. 6c.

Gear 502 may be driven by gear 503 anti-clockwise about an axis parallel to the y direction via sun shaft 525, planetary gear assembly 529, carrier shaft 527, output shaft 501, carrier shaft 526, planetary gear assembly 528 and sun shaft 524. In the planetary gear assembly 529, gear 531 may be driven by gear 530 clockwise about an axis parallel to the y direction without gear gap at each engaged tooth, as shown in FIG. 6e. In the planetary gear assembly 528, gear 533 may be driven by gear 534 anti-clockwise about an axis parallel to the y direction without gear gap at each engaged tooth, as shown in FIG. 6d.

Gear 504 may be driven by gear 502 clockwise about an axis parallel to the x direction without gear gap at each engaged tooth, as shown in FIG. 6b.

Gear 507 may be driven by gear 504 clockwise.

Gear 506 may be driven by gear 507 anti-clockwise about an axis parallel to the x direction without gear gap at each engaged tooth, as shown in FIG. 6a.

The forward motion of the closed loop gear train is completed. There is no gear gap at each engaged tooth encountered along the forward motion path.

Backward motion (motion indicated by a double solid line arrow ══▶ in FIG. 6a, FIG. 6b, FIG. 6c, FIG. 6d, and FIG. 6e in which the direction of motion is determined by directions x, y in FIG. 5a and the definition of clockwise in FIG. 1e):

The input shaft 509 may be driven by an external torque to rotate clockwise about an axis parallel to the x direction. Gear 507 may be driven by gear 506 anti-clockwise about an axis parallel to the x direction without gear gap at each engaged tooth, as shown in FIG. 6a.

Gear 504 may be driven by gear 507 anti-clockwise about an axis parallel to the x direction. Gear 502 may be driven by gear 504 clockwise about an axis parallel to the y direction without gear gap at each engaged tooth, as shown in FIG. 6b.

Gear 503 may be driven by gear 502 clockwise about an axis parallel to the y direction via sun shaft 524, planetary gear assembly 528, carrier shaft 526, output shaft 501, carrier shaft 527, planetary gear assembly 529 and sun shaft 525. In the planetary gear assembly 528, gear 534 may be driven by gear 533 anti-clockwise about an axis parallel to the y direction without gear gap at each engaged tooth, as shown in FIG. 6d. In the planetary gear assembly 529, gear 530 may be driven by gear 531 clockwise about an axis parallel to the y direction without gear gap at each engaged tooth, as shown in FIG. 6e.

Gear 505 may be driven by gear 503 anti-clockwise about an axis parallel to the x direction without gear gap at each engaged tooth, as shown in FIG. 6c.

Gear 508 may be driven by gear 505 anti-clockwise about an axis parallel to the x direction.

The backward motion of the closed loop gear train is completed. There is no gear gap at each engaged tooth encountered along the backward motion path.

In the present application, there is no backlash in the forward and backward motion directions because there is no gear gap at each engaged tooth for all gears of the closed loop gear train during the forward and backward motions.

Fourth Embodiment

Figure 7A:
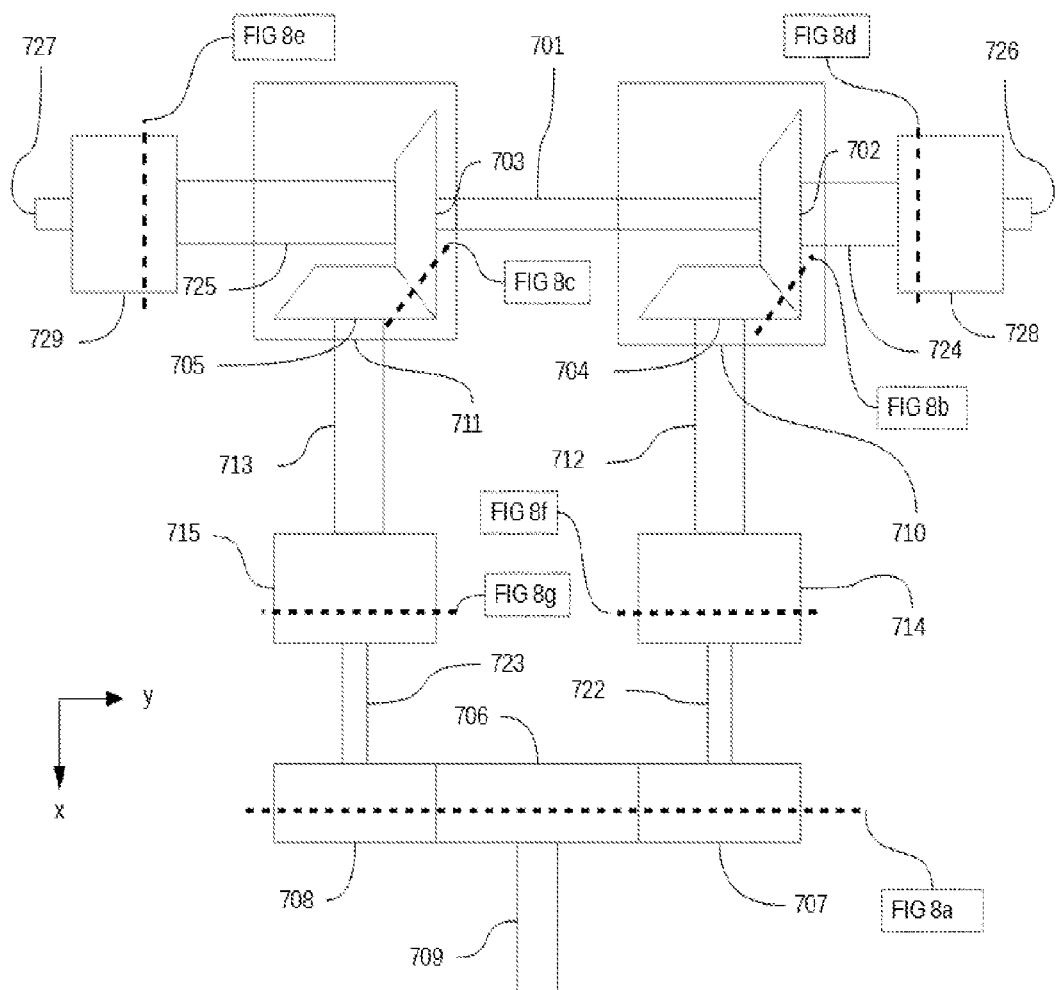
FIG. 7a is a block diagram of the zero backlash right angle transmission system according to a fourth embodiment of the present application.
Figure 7B:
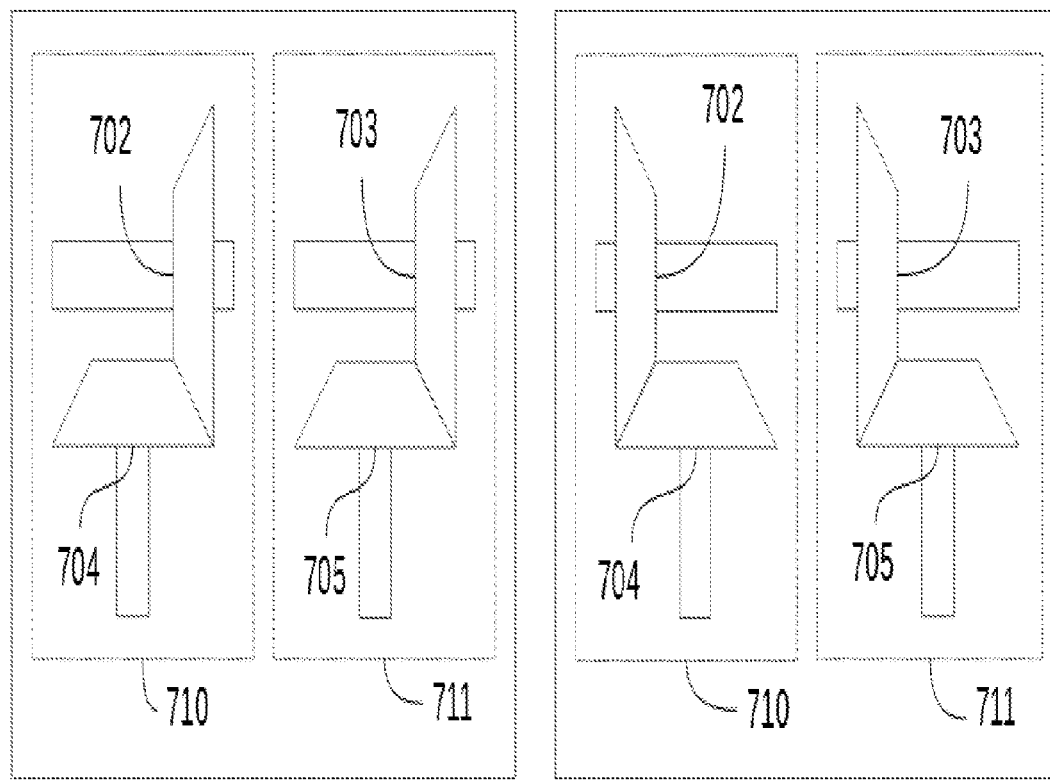
FIG. 7b shows different gear orientation options of the zero backlash right angle transmission system.
Figure 7C:
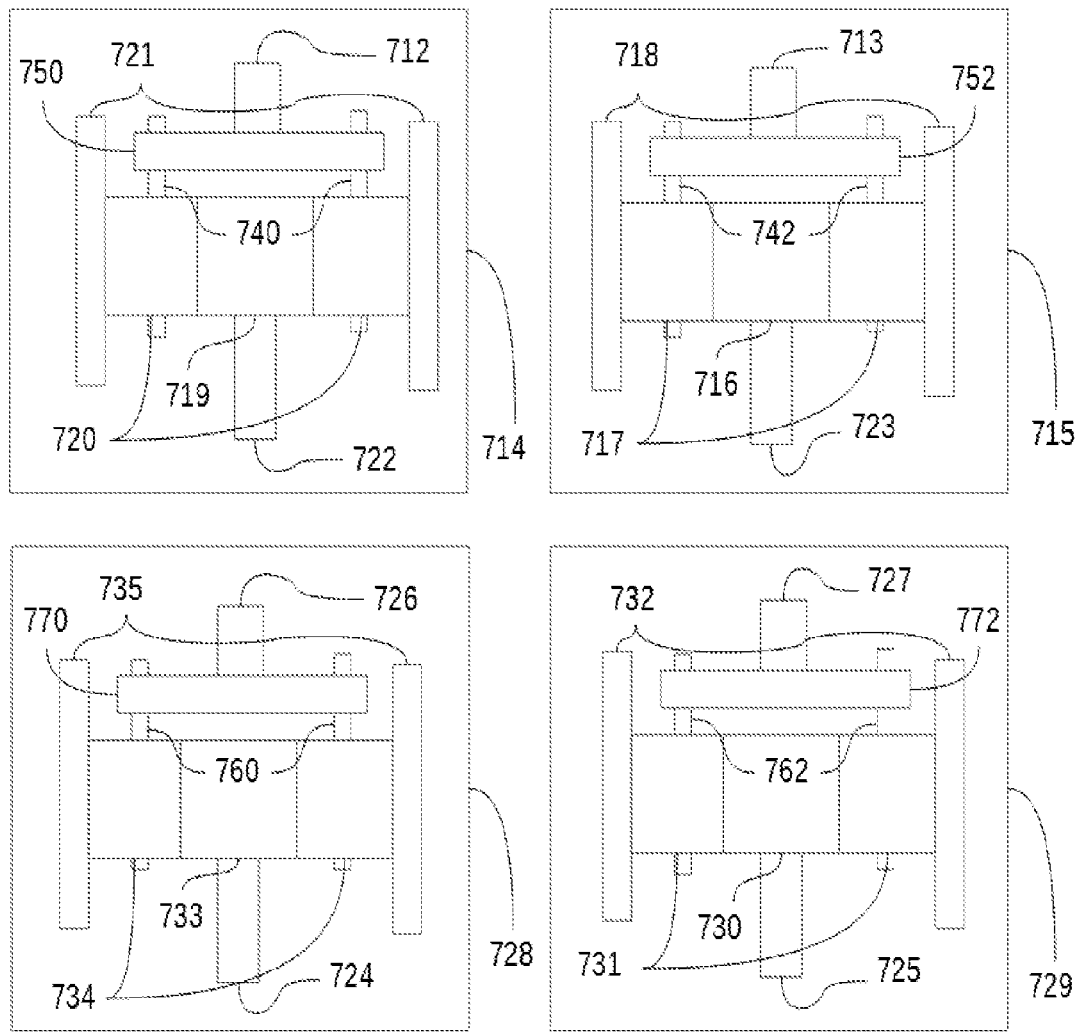
FIG. 7c shows the planetary gear assemblies of the zero backlash right angle transmission system.
Figure 7D:
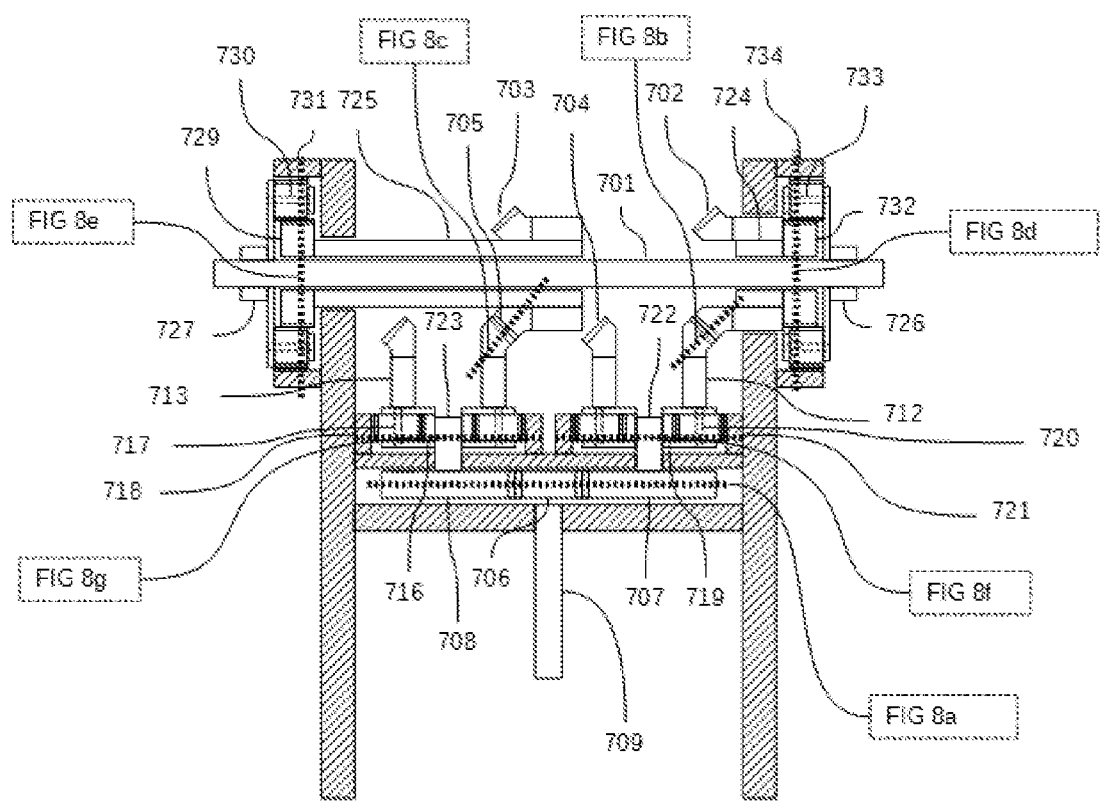
FIG. 7d is a cross sectional view of the zero backlash right angle transmission system according to the fourth embodiment of the present application.

In another embodiment, according to FIG. 7a, FIG. 7c, and FIG. 7d, the zero backlash right angle transmission system may include four Bevel gears 702, 703, 704, 705, four planetary gear assemblies 714, 715, 728, 729, three spur gears 706, 707, 708, one output shaft 701 and one input shaft 709.

The output shaft 701 may be fixed to hollow carrier shafts 726, 727 of planetary gear assemblies 728, 729 through the center of hollow sun shafts 724, 725 of planetary gear assemblies 728, 729 respectively. The sun shafts 724, 725 may be fixed to gears 702, 703 respectively. Sun gears 733, 730 may be mounted on the hollow sun shafts 724, 725 respectively coupled with the other ones of the gears 702, 703 which may be sleeved around the output shaft 701. Gears 702, 703 may be engaged with gears 704, 705 respectively in order to turn transmission at right angle.

The gear 704 may be fixed to the carrier shaft 712 of planetary gear assembly 714 with its sun shaft 722 being fixed to gear 707.

The gear 705 may be fixed to the carrier shaft 713 of planetary gear assembly 715 with its sun shaft 723 being fixed to gear 708.

Gears 707, 708 may be engaged with gear 706 which may be fixed to input shaft 709.

Although gears 702, 703, 704, 705 shown in FIG. 7a and FIG. 7d are Bevel gears (FIG. 1f), it is understood that Miter gears (FIG. 1g), crown gears (FIG. 1h), hypoid gears (FIG. 1i), spiral helical gears (FIG. 1j) and any gears providing transmission at right angle can be applied. Similarly, although gears 706, 707, 708 shown in FIG. 7a and FIG. 7d are spur gears (FIG. 1k), it is understood that single helical gears (FIG. 1l), double helical gears (FIG. 1m) and any gears providing transmission at zero angle can be applied.

Two different orientations of the Bevel gears 702, 703, 704, 705 are shown in FIG. 7b. It is understood that other orientations may be possible and is not limited to the illustrated ones. The definition of the sign of gear ratio is positive if both the input and output rotational directions are the same, or else negative as shown in FIG. 1c.

The transmission angle of planetary gear assemblies 714, 715, 728, 729 as shown in FIG. 7c is zero degree. The planetary gear assemblies may be replaced with simple shafts or other zero angle transmission gear assemblies that can be driven in reverse direction. The gear assemblies 714, 715, 728, 729 may have backlash.

In another embodiment, according to FIG. 7a, FIG. 7c, FIG. 7d, gear train may include gear 706, gear 708, sun shaft 723, planetary gear assembly 715, carrier shaft 713, gear 705, gear 703, sun shaft 725, planetary gear assembly 729, carrier shaft 727, output shaft 701, carrier shaft 726, planetary gear assembly 728, sun shaft 724, gear 702, gear 704, carrier shaft 712, planetary gear assembly 714, sun shaft 722, and gear 707 which may be engaged back with gear 706, thereby forming a closed loop gear train.

The selection of the gears 702, 703, 704, 705 706, 707, 708 and gear assemblies 714, 715, 728, 729 may not be restrictive but may require to satisfy the result of calculation that starting at any point in the closed loop gear train, the result of multiplication of the gear ratio of all gears and gear assemblies along the closed loop is equal to a positive one according to the definition of the sign of gear ratio that it is positive if both input and output rotational directions are the same, or else negative, as shown in FIG. 1c.

FIG. 7a, FIG. 7c, and FIG. 7d also show a method for backlash elimination in a zero backlash right angle transmission system.

During assembly process, the sun shaft 722 is applied with an action torque in one direction and gear 707 is applied with a reaction torque in other direction. Then, the sun shaft 722 and gear 707 may be fixed to each other after the preload action torque and reaction torque distributed along the closed loop gear train, which can eventually make the spur gears 706, 707, 708, the Bevel gears 702, 704 of the right angle transmission gear assembly 710, the Bevel gears 703, 705 of the right angle transmission gear assembly 711, sun gear 719, planet gears 720 and ring gear 721 of planetary gear assembly 714, sun gear 716, planet gears 717 and ring gear 718 of planetary gear assembly 715, sun, planet and ring gears 733, 734, 735 of planetary gear assembly 728, and sun, planet and ring gears 730, 731, 732 of planetary gear assembly 729 being tightly meshed one another so as to have gear backlash eliminated in the closed loop gear train.

Planet gears 720 may be mounted on planet shafts 740 which may be carried by carrier 750 mounted on carrier shaft 712. Planet gears 717 may be mounted on planet shafts 742 which may be carried by carrier 752 mounted on carrier shaft 713. Planet gears 734 may be mounted on planet shafts 760 which may be carried by carrier 770 mounted on hollow carrier shaft 726 sleeved around the output shaft 701. Planet gears 731 may be mounted on planet shafts 762 which may be carried by carrier 772 mounted on hollow carrier shaft 727 sleeved around the output shaft 701.

The backlash elimination is described in detail as follows (torque indicated by a single solid line arrow → in FIG. 8a, FIG. 8b, FIG. 8c, FIG. 8d, FIG. 8e, FIG. 8f, and FIG. 8g in which the direction of torque is determined by directions x, y in FIG. 7a and the definition of clockwise in FIG. 1e):

The sun shaft 722 is applied with action toque so that the gear 719 of planetary gear assembly 714 tends to rotate anti-clockwise about an axis parallel to the x direction.

Figure 8A:
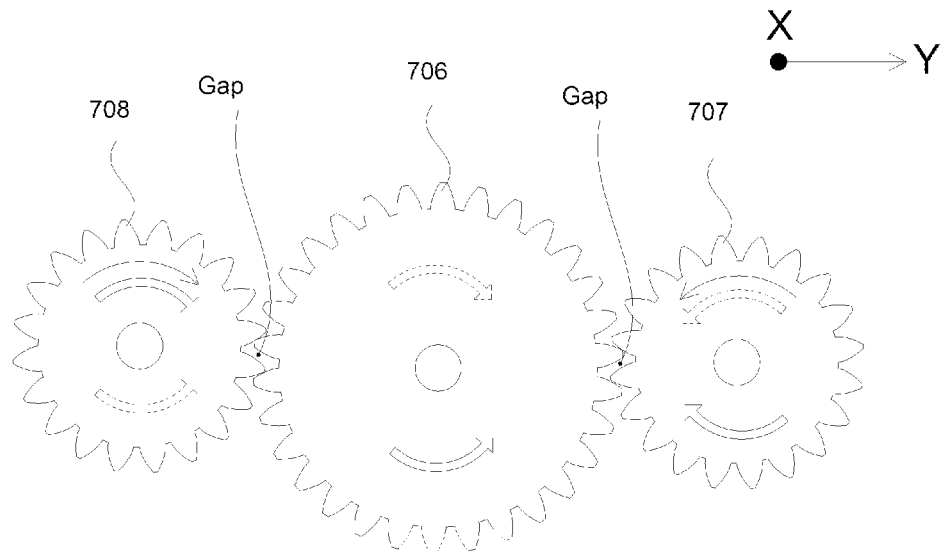
FIG. 8a shows the direction of torque and rotation of the input gears of the zero backlash right angle transmission system.

On the other side, gear 707 is applied with reaction torque clockwise and tends to rotate clockwise about an axis parallel to the x direction, as shown in FIG. 8a.

Because the same action torque and reaction torque are only applied in the closed loop gear train, all gears and shafts slightly rotate until all gears are tightly meshed and finally all gears and shafts in the closed loop train are stationary.

More details of the transmission of torque throughout the entire closed loop gear train are described below.

Figure 8B:
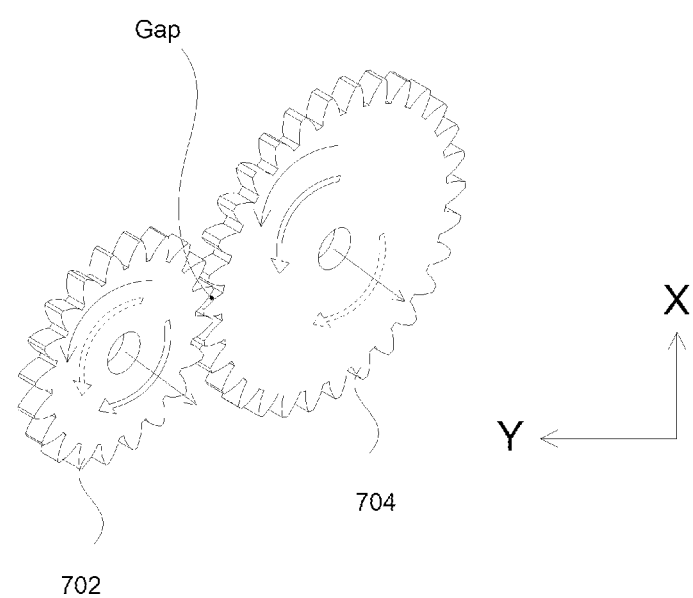
FIG. 8b shows the direction of torque and rotation of a first right angle transmission gear assembly of the zero backlash right angle transmission system.
Figure 8C:
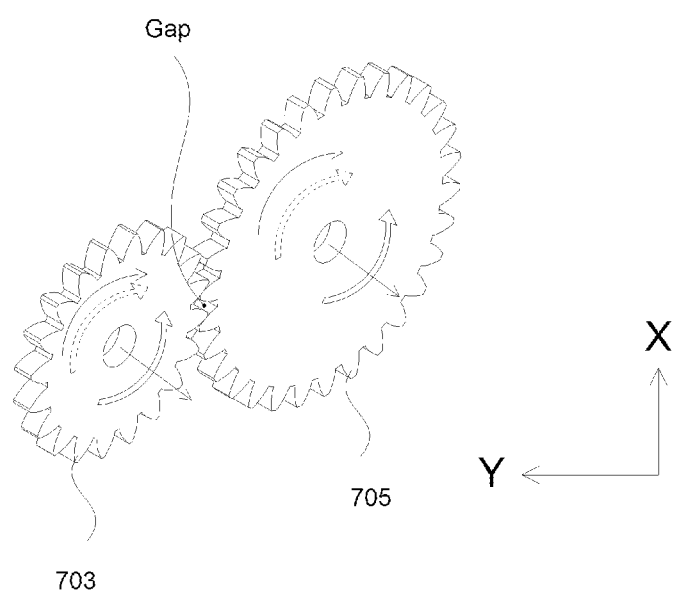
FIG. 8c shows the direction of torque and rotation of a second right angle transmission gear assembly of the zero backlash right angle transmission system.
Figure 8D:
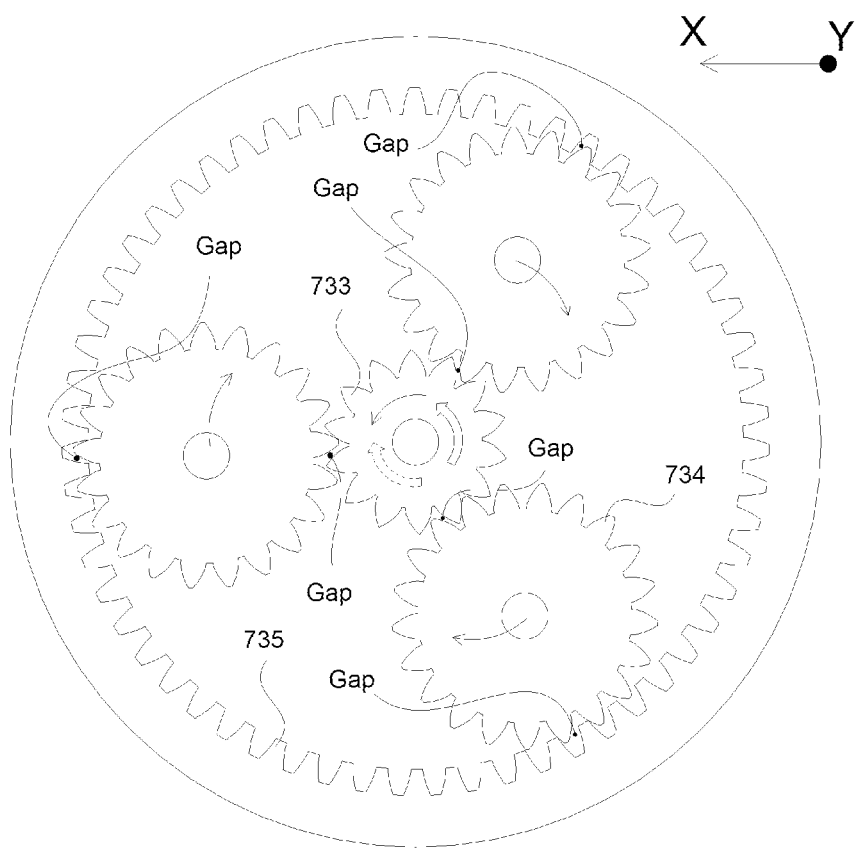
FIG. 8d shows the direction of torque and rotation of a first planetary gear assembly of the zero backlash right angle transmission system.
Figure 8E:
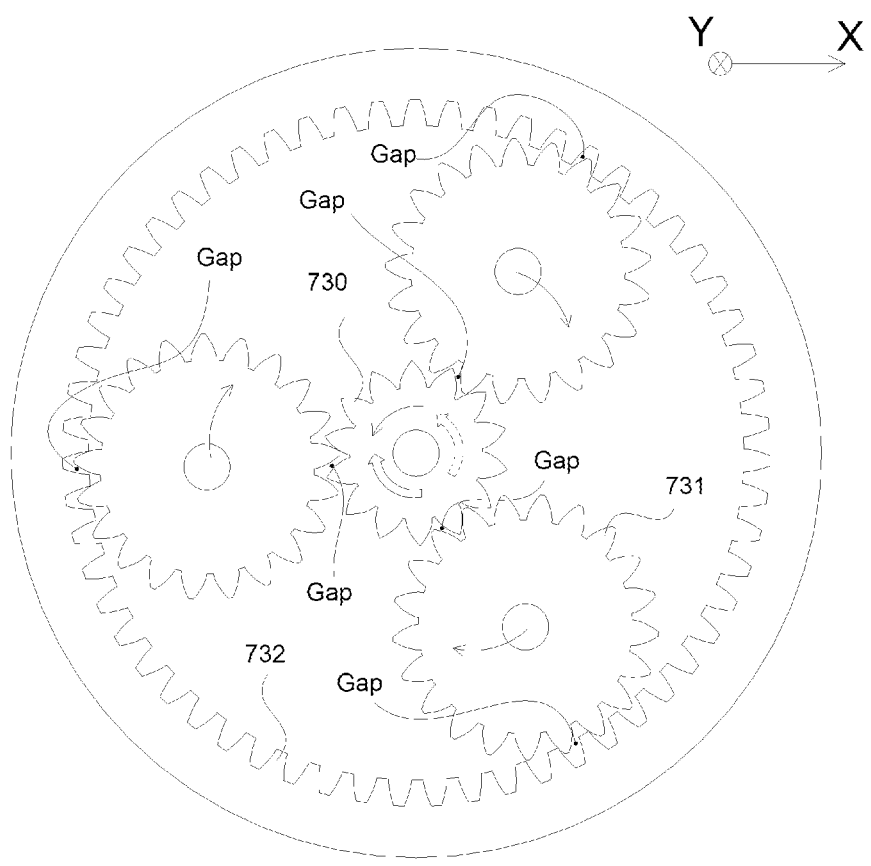
FIG. 8e shows the direction of torque and rotation of a second planetary gear assembly of the zero backlash right angle transmission system.
Figure 8F:
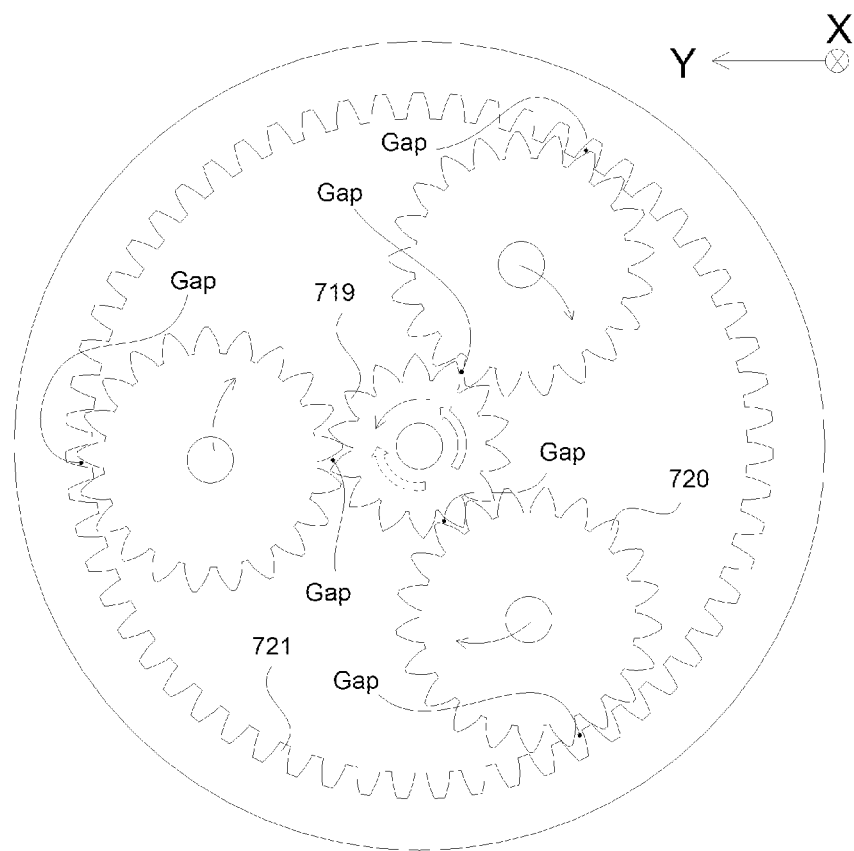
FIG. 8f shows the direction of torque and rotation of a third planetary gear assembly of the zero backlash right angle transmission system.

Gear 704 stops sun shaft 722 to rotate with torque anti-clockwise via carrier shaft 712 and planetary gear assembly 714. Under the torque, there is no gap at one side of each engaged tooth between gear 719 and gear 720, as well as each engaged tooth between gear 720 and gear 721, but there is a gap at another side of each engaged tooth, as shown in FIG. 8f.

Gear 702 stops gear 704 to rotate with torque anti-clockwise about an axis parallel to the y direction. Under the torque, there is no gap at one side of each engaged tooth between gear 702 and gear 704, but there is a gap at another side of each engaged tooth, as shown in FIG. 8b.

Gear 703 stops gear 702 to rotate with torque clockwise about an axis parallel to the y direction via the sun shaft 725, planetary assembly 729, carrier shaft 727, output shaft 701, carrier shaft 726, planetary assembly 728 and sun shaft 724. Under the torque, there is no gap at one side of each engaged tooth between gear 733 and gear 734, as well as each engaged tooth between gear 734 and gear 735, but there is a gap at another side of each engaged tooth, as shown in FIG. 8d. Also, there is no gap at one side of each engaged tooth between gear 730 and gear 731, as well as each engaged tooth between gear 731 and gear 732, but there is a gap at another side of each engaged tooth, as shown in FIG. 8e.

Gear 705 stops gear 703 to rotate with torque clockwise about an axis parallel to the x direction. Under the torque, there is no gap at one side of each engaged tooth between gear 703 and gear 705, but there is a gap at another side of each engaged tooth, as shown in FIG. 8c.

Figure 8G:
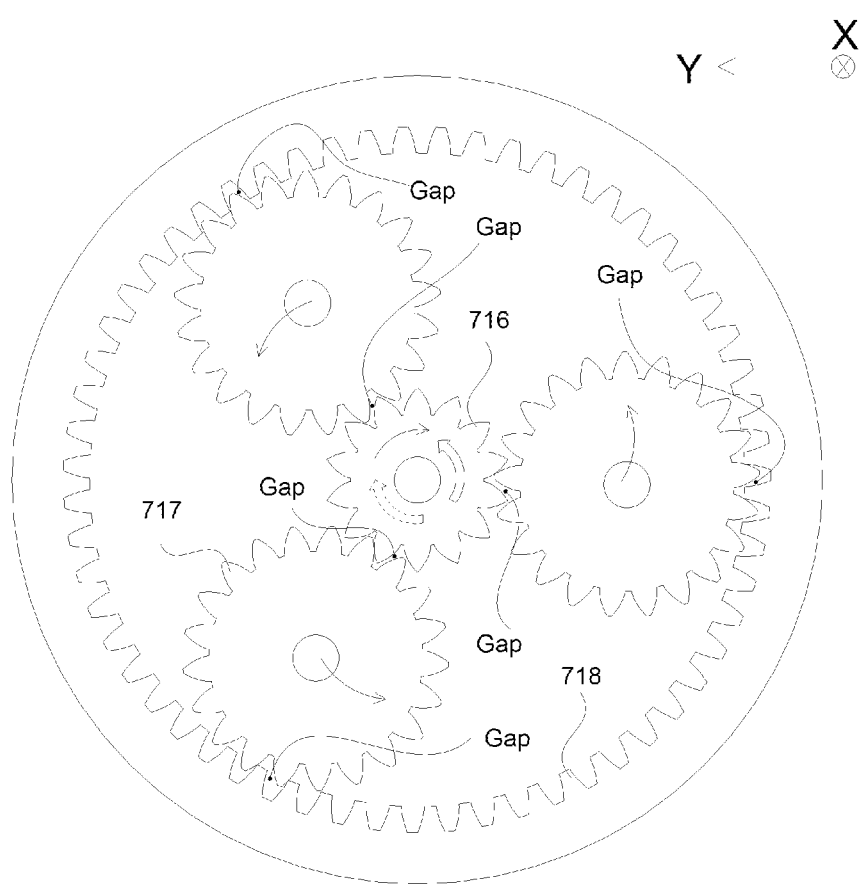
FIG. 8g shows the direction of torque and rotation of a fourth planetary gear assembly of the zero backlash right angle transmission system.

Gear 708 stops gear 705 to rotate with torque anti-clockwise about an axis parallel to the x direction via the sun shafts 723, planetary gear assemblies 715 and carrier shafts 713. Under the torque, there is no gap at one side of each engaged tooth between gear 716 and gear 717, as well as each engaged tooth between gear 717 and gear 718, but there is a gap at another side of each engaged tooth, as shown in FIG. 8g.

Gear 707 stops gear 708 via gear 706 to rotate with torque clockwise about an axis parallel to the x direction. Under the torque, there is no gap at one side of each engaged tooth between gear 708 and gear 706, as well as each engaged tooth between gear 706 and gear 707, but there is a gap at another side of each engaged tooth, as shown in FIG. 8a.

Through applying preload which distributes along the closed loop gear train, there is no gap at one side of each engaged tooth of the gears and thus backlash of the closed loop gear train can be eliminated in whichever direction the external input torque is applied because the closed loop gear train offers two separated gear trains (along which there is no gear gap at each engaged tooth in the driving direction) from input shaft to output shaft.

FIG. 7a, FIG. 7c, and FIG. 7d show forward and backward motions without backlash provided by the closed loop gear train.

After preloading, the input shaft 709 driven by an external torque generates forward and backward rotational motions at the output shaft 701 without backlash. In fact, the external torque drives the whole set of gears and shafts in the closed loop gear train all together in which there is no gear gap at each engaged tooth between gears in the direction of rotational motion as they have already been eliminated during preloading. The details are explained as follows:

Forward motion (motion indicated by a double dot line arrow ⇢ in FIG. 8a, FIG. 8b, FIG. 8c, FIG. 8d, FIG. 8e, FIG. 8f, and FIG. 8g in which the direction of motion is determined by directions x, y in FIG. 7a and the definition of clockwise in FIG. 1e):

The input shaft 709 may be driven by an external torque to rotate anti-clockwise about an axis parallel to the x direction. Gear 708 may be driven by gear 706 clockwise about an axis parallel to the x direction without gear gap at each engaged tooth, as shown in FIG. 8a.

Gear 705 may be driven clockwise by gear 708 about an axis parallel to the x direction via sun shaft 723, planetary gear assembly 715 and carrier shaft 713. In the planetary gear assembly 715, gear 717 may be driven by gear 716 anti-clockwise about an axis parallel to the x direction without gear gap at each engaged tooth, as shown in FIG. 8g.

Gear 703 may be driven by gear 705 anti-clockwise about an axis parallel to the y direction without gear gap at each engaged tooth, as shown in FIG. 8c.

Gear 702 may be driven by gear 703 anti-clockwise about an axis parallel to the y direction via sun shaft 725, planetary gear assembly 729, carrier shaft 727, output shaft 701, carrier shaft 726, planetary gear assembly 728 and sun shaft 724.

In planetary gear assembly 729, gear 731 may be driven by gear 730 clockwise about an axis parallel to the y direction without gear gap at each engaged tooth, as shown in FIG. 8e. Gear 733 may be driven by gear 734 anti-clockwise about an axis parallel to the y direction without gear gap at each engaged tooth, as shown in FIG. 8d.

Gear 704 may be driven by gear 702 clockwise about an axis parallel to the x direction without gear gap at each engaged tooth, as shown in FIG. 8b.

Gear 707 may be driven by gear 704 clockwise via carrier shaft 712, planetary gear assemblies 714 and sun shaft 722. In the planetary gear assembly 714, gear 719 may be driven by gear 720 clockwise about an axis parallel to the x direction without gear gap at each engaged tooth as shown in FIG. 8f.

Gear 706 may be driven by gear 707 anti-clockwise about an axis parallel to the x direction without gear gap at each engaged tooth, as shown in FIG. 8a.

The forward motion of the closed loop gear train is completed. There is no gear gap at each engaged tooth encountered along the forward motion path.

Backward motion (motion indicated by a double solid line arrow 2 in FIG. 8a, FIG. 8b, FIG. 8c, FIG. 8d, FIG. 8e, FIG. 8f, and FIG. 8g in which the direction of motion is determined by directions x, y in FIG. 7a and the definition of clockwise in FIG. 1e):

The input shaft 709 may be driven by an external torque to rotate clockwise about an axis parallel to the x direction. Gear 707 may be driven by gear 706 anti-clockwise about an axis parallel to the x direction without gear gap at each engaged tooth, as shown in FIG. 8a.

Gear 704 may be driven by gear 707 anti-clockwise about an axis parallel to the x direction via sun shaft 722, planetary gear assemblies 714 and carrier shafts 712. In the planetary gear assembly 714, gear 720 may be driven by gear 719 clockwise about an axis parallel to the x direction without gear gap at each engaged tooth, as shown in FIG. 8f. Gear 702 may be driven by gear 704 clockwise about an axis parallel to the y direction without gear gap at each engaged tooth, as shown in FIG. 8b.

Gear 703 may be driven by gear 702 clockwise about an axis parallel to the y direction via sun shaft 724, planetary gear assemblies 728, carrier shaft 726, output shaft 701, carrier shaft 727, planetary gear assembly 729 and sun shaft 725. In the planetary gear assembly 728, gear 734 may be driven by gear 733 anti-clockwise about an axis parallel to the y direction without gear gap at each engaged tooth, as shown in FIG. 8d. In the planetary gear assembly 729, gear 730 may be driven by gear 731 clockwise about an axis parallel to the y direction without gear gap at each engaged tooth, as shown in FIG. 8e.

Gear 705 may be driven by gear 703 anti-clockwise about an axis parallel to the y direction without gear gap at each engaged tooth, as shown in FIG. 8c.

Gear 708 may be driven by gear 705 anti-clockwise about an axis parallel to the x direction via carrier shaft 713, planetary gear assembly 715 and sun shaft 723. In the planetary gear assembly 715, gear 716 may be driven by gear 717 anti-clockwise about an axis parallel to the x direction without gear gap at each engaged tooth, as shown in FIG. 8g.

The backward motion of the closed loop gear train is completed. There is no gear gap at each engaged tooth encountered along the backward motion path.

In the present application, there is no backlash in the forward and backward motion directions because there is no gear gap at each engaged tooth for all gears of the closed loop gear train during the forward and backward motions.

Examples of Application

For robot arm design, the torque, speed, power and precision are important factors to be considered. In the conventional approach, to achieve high precision, motor direct drive (without gear reduction) or expensive high precision gear box having minimum backlash are commonly adopted.

For high torque, high precision application in robot arm, large motor with direct drive is commonly used. The disadvantages are: (1) It is expensive and big because heavy motor is needed. (2) Its high inertia increases difficulty in control, and (3) It is of low power efficiency for low speed application.

The other approach is to use small motor coupling with a gear box to replace a large motor. The advantages are (1) It is lower cost and less heavy, (2) Its lower inertia facilitates the control, (3) Its power efficiency is much higher, and (4) more compact design is allowed. However, the gaps among gears introduce backlash which is an obstacle for use in precision control.

The zero backlash right angle transmission method of the present application is an innovative method to eliminate the backlash. The basic principle is to preload an opposite torque to the gear trains so as to make the gears closely mesh with one another so that backlash no longer exists in either rotating direction.

Without the backlash, a small motor coupling with a gear box can directly replace a large motor to have the above advantages such as low cost, high precision, less heavy, more compact and higher power efficiency.

FIGS. 9(a) and 9(b) are side and front views of a conventional design of a robotic arm joint. It may include a fixed arm link 900, a moving arm link 902 and a motor 904.

FIGS. 10(a) and 10(b) are side and front views of a robotic arm joint with the zero backlash right angle transmission system of the present application incorporated therein. It may include a fixed arm link 1000, a moving arm link 1002, and a motor 1004. The motor 1004 can be embedded into the fixed arm link 1000. For a robot arm, the gears may be placed at the arm joint and/or in the arm link to increase the gear ratio. In FIGS. 10(a) and 10(b), gears 1006 may be placed at the arm joint.

FIGS. 11(a) and 11(b) are side and front views of another robotic arm joint with the zero backlash right angle transmission system of the present application incorporated therein. It may include a fixed arm link 1100, a moving arm link 1102, and a motor 1104. The motor 1104 can be embedded into the fixed arm link 1100. Gears 1106 may be placed at the arm joint, and compact gears 1108 may be placed in the fixed arm link 1100.

The present application can provide a right angle transmission with higher gear ratio from motor to a robot arm joint, and provide a method to eliminate the backlash of all gears in the transmission so that a small motor can be used for the design of precise and compact robot arm instead of using a big motor.

This application discloses the design of zero backlash right angle transmission system which can be used as rotational joints for robot arms, hands and fingers. The zero backlash right angle assembly may include spur gears, optional planetary gear assemblies, Bevel gears, input shaft and output shaft offers two parallel gear trains from input shaft to output shaft. It performs right angle transmission without backlash.

There is a gear train from input shaft to output shaft for clockwise rotation. There is another gear train from input shaft to output shaft for anti-clockwise rotation. Such two gear trains may be preloaded with torque in clockwise and anti-clockwise with opposite direction. The gear train preloaded with clockwise torque will be used as clockwise rotational path. Similarly, the gear train preloaded with anti-clockwise torque will be used as anti-clockwise rotational path. So, there will be no backlash in the torque transmission in whatever rotational direction.

This application provides the advantages of robot arm design with high torque, zero backlash and compact size. This application discloses a zero backlash right angle transmission system which include one input shaft, four Bevel gears, four planetary gear assemblies if included in the design, three spur gears and one output shaft for transmitting power between input shaft and output shaft with right angle transmission. The four Bevel gears, the four planetary gear assemblies if included in the design, the three spur gears and the one output shaft may be arranged to form a closed loop gear train for backlash elimination.

The closed loop gear train also offers two parallel gear trains for the input shaft to drive the output shaft in forward or backward motion via the two parallel gear trains. The motion from input shaft may be transmitted to output shaft via a gear of one end of a gear train, an optional planetary gear assembly, right angle transmission gear assembly such as a pair of Bevel gears, another one optional planetary gear assembly and then to the output shaft. The motion of the output shaft will drive back the output end of another set of gear train to the input end gear to form a closed loop.

The two ends of output shaft may be fixed to two Bevel gears directly or fixed to the carrier shafts of two planetary gear assemblies which sun shafts may be fixed to two Bevel gears if the two planetary gear assemblies are included in the design. The two Bevel gears may be coupled to another two Bevel gears to form two right angle transmission assemblies. The last mentioned two Bevel gears may be fixed to two spur gears directly or fixed to the carrier shafts of another two planetary gear assemblies which sun shafts may be fixed to two spur gears if the two planetary gear assemblies are included in the design. Both the two spur gears may be coupled to another one spur gear which may be fixed to an input shaft. The output shaft, four Bevel gears, four planetary gears assemblies if the two planetary gear assemblies are included in the design and the three spur gears form a closed loop gear train. The output shaft may be able to be driven by the input shaft via three spur gears, four planetary gear assemblies if the two planetary gear assemblies are included in the design and four Bevel gears for forward and backward motion in the closed loop gear train.

The method of backlash elimination for the closed loop gear train of the zero backlash right angle transmission system is also disclosed. Through applying the preload which distributes along the closed loop gear train, there is no gap of engaged tooth at one side of gears. Thus the backlash of the closed loop train can be eliminated in whichever external input torque are applied because the closed loop gear train offers two separated gear trains (along which there is no gear gap at the engaged tooth in the direction of driving) from the input shaft to the output shaft.

While the zero backlash right angle transmission system has been shown and described with particular references to a number of preferred embodiments thereof, it should be noted that various other changes or modifications may be made without departing from the scope of the appended claims.

What is claimed is:

1. A zero backlash right angle transmission system comprising:
   (a) an input shaft (109, 309, 509, 709) with an input gear (106, 306, 506, 706) mounted thereon;
   (b) an output shaft (101, 301, 501, 701);
   (c) first and second drive gears (107, 108; 307, 308; 507, 508; 707, 708) meshing with the input gear (106, 306, 506, 706), and mounted respectively on first and second drive shafts (122, 123; 322, 323; 522, 523; 722, 723) parallel to the input shaft (109, 309, 509, 709);
   (d) a first right angle transmission gear assembly (110, 310, 510, 710) comprising a first pair of meshing gears (102, 104; 302, 304; 502, 504; 702, 704), rotation axes of which are disposed at right angle to each other, one of the first pair of meshing gears (104, 304, 504, 704) being mounted on the first drive shaft (122, 322, 522, 722) and the other one of the first pair of meshing gears (102, 302, 502, 702) being mounted on the output shaft (101, 301, 501, 701);
   (e) a second right angle transmission gear assembly (111, 311, 511, 711) comprising a second pair of meshing gears (103, 105; 303 305; 503, 505; 703, 705), rotation axes of which are disposed at right angle to each other, one of the second pair of meshing gears (105, 305, 505, 705) being mounted on the second drive shaft (123, 323, 523, 723) and the other one of the second pair of meshing gears (103, 303, 503, 703) being mounted on the output shaft (101, 301, 501, 701) at a distance from and parallel to the other one of the first pair of meshing gears (102, 302, 502, 702); and
   (f) a first planetary gear assembly (528) coupled with the other one of the first pair of meshing gears (502) and coaxially disposed at a first end of the output shaft (501), and a second planetary gear assembly (529) coupled with the other one of the second pair of meshing gears (503) and coaxially disposed at a second end of the output shaft (501);
   (g) wherein all of the gears form a closed loop gear train that drives the output shaft (101, 301, 501, 701) forward and backward without backlash.

2. The zero backlash right angle transmission system as claimed in claim 1, further comprising a third planetary gear assembly (314) mounted between the first drive gear (307) and the one of the first pair of meshing gears (304), and a fourth planetary gear assembly (315) mounted between the second drive gear (308) and the one of the second pair of meshing gears (305).

3. The zero backlash right angle transmission system as claimed in claim 2, wherein the third planetary gear assembly (314) comprises:
   a third sun gear (319) mounted on a third sun shaft (322) on which the first drive gear (307) is mounted;
   a third ring gear (321);

a third plurality of planet gears (320) mounted on a plurality of planet shafts (340), and meshing with the sun gear (319) and the ring gear (321); and a third carrier (350) carrying the third plurality of planet shafts (340) and mounted on a third carrier shaft (312) on which the one of the first pair of meshing gears (304) is mounted.

4. The zero backlash right angle transmission system as claimed in claim 2, wherein the fourth planetary gear assembly (315) comprises:

a fourth sun gear (316) mounted on a fourth sun shaft (323) on which the second drive gear (308) is mounted;

a fourth ring gear (318);

a end fourth plurality of planet gears (317) mounted on a fourth plurality of planet shafts (342), and meshing with the fourth sun gear (316) and the fourth ring year (318); and a fourth carrier (352) carrying the fourth plurality of planet shafts (342) and mounted on a fourth carrier shaft (313) on which the one of the second pair of meshing gears (305) is mounted.

5. The zero backlash right angle transmission system as claimed in claim 1, wherein the first planetary gear assembly (528) comprises:

a first sun gear (533) mounted on a first hollow sun shaft (524) coupled with the other one of the first pair of meshing gears (502) and sleeved around the output shaft (501);

a first ring gear (535);

a first plurality of planet gears (534) mounted on a first plurality of planet shafts (540), and meshing with the first sun gear (533) and the first ring gear (535); and a first carrier (550) carrying the first plurality of planet shafts (540) and mounted on a first hollow carrier shaft (526) sleeved around the output shaft (501).

6. The zero backlash right angle transmission system as claimed in claim 1, wherein the second planetary gear assembly (529) comprises:

a second sun gear (530) mounted on a second hollow sun shaft (525) coupled with the other one of the second pair of meshing gears (503) and sleeved around the output shaft (501);

a second ring gear (532);

a second plurality of planet gears (531) mounted on a second plurality of planet shafts (542), and meshing with the second sun gear (530) and the second ring gear (532); and a second carrier (552) carrying the second plurality of planet shafts (542) and mounted on a second hollow carrier shaft (527) sleeved around the output shaft (501).

7. The zero backlash right angle transmission system as claimed in claim 1, wherein the input gear, the first drive gear and the second drive gear (106, 107, 108; 306, 307, 308; 506, 507, 508; 706, 707, 708) are selected from the group consisting of spur gears, single helical gears, and double helical gears.

8. The zero backlash right angle transmission system as claimed in claim 1, wherein the first and second pairs of meshing gears (102, 104, 103, 105; 302, 304, 303, 305; 502, 504, 503, 505; 702, 704, 703, 705) are selected from the group consisting of Bevel gears, Miter gears, crown gears, hypoid gears, and spiral helical gears.

9. A zero backlash right angle transmission method comprising:

(a) providing an input shaft (109, 309, 509, 709) with an input gear (106, 306, 506, 706) mounted thereon;

(b) providing an output shaft (101, 301, 501, 701) disposed at right angle with respect to the input shaft (109, 309, 509, 709);

(c) providing a first gear train (102, 104, 107; 302, 304, 307; 502, 504, 507; 702, 704, 707) mounted between the input gear (106, 306, 506, 706) and the output shaft (101, 301, 501, 701) for rotation in one direction;

(d) providing a second gear train (103, 105, 108; 303, 305, 308; 503, 505, 508; 703, 705, 708) mounted between the input gear (106, 306, 506, 706) and the output shaft (101, 301, 501, 701) for rotation in an opposite direction, the first and second gear trains being disposed in parallel relationship and formed into a closed loop gear train;

(e) preloading the first gear train with torque in the one direction; and (f) preloading the second gear train with torque in the opposite direction, thereby eliminating backlash of the first and second gear trains when the input shaft (109, 309, 509, 709) is rotated in either direction; wherein:

the step of providing a first gear train comprises providing a first drive gear (107, 307, 507, 707) meshing with the input gear (106, 306, 506, 706), and mounted on a first drive shaft (122, 322, 522, 722) parallel to the input shaft (109, 309, 509, 709); providing a first right angle transmission gear assembly (110, 310, 510, 710) comprising a first pair of meshing gears (102, 104; 302, 304; 502, 504; 702, 704), rotation axes of which are disposed at right angle to each other, one of the first pair of meshing gears (104, 304, 504, 704) being mounted on the first drive shaft (122, 322, 522, 722) and the other one of the first pair of meshing gears (102, 302, 502, 702) being mounted on the output shaft (101, 301, 501, 701); and providing a first planetary gear assembly (528) coupled with the other one of the first pair of meshing gears (502) and coaxially disposed at a first end of the output shaft (501); and the step of providing a second gear train comprises providing a second drive gear (108, 308, 508, 708) meshing with the input gear (106, 306, 506, 706), and mounted on a second drive shaft (123, 323, 523, 723) parallel to the input shaft (109, 309, 509, 709); providing a second right angle transmission gear assembly (111, 311, 511, 711) comprising a second pair of meshing gears (103, 105; 303 305; 503, 505; 703, 705), rotation axes of which are disposed at right angle to each other, one of the second pair of meshing gears (105, 305, 505, 705) being mounted on the second drive shaft (123, 323, 523, 723) and the other one of the second pair of meshing gears (103, 303, 503, 703) being mounted on the output shaft (101, 301, 501, 701) at a distance from and parallel to the other one of the first pair of meshing gears (102, 302, 502, 702); and providing a second planetary gear assembly (529) coupled with the other one of the second pair of meshing gears (503) and coaxially disposed at a second end of the output shaft (501).

10. The zero backlash right angle transmission method as claimed in claim 9, wherein the step of providing a first gear train further comprises providing a third planetary gear assembly (314) mounted between the first drive gear (307) and the one of the first pair of meshing gears (304); and the step of providing a second gear train further comprises providing a fourth planetary gear assembly (315) mounted between the second drive gear (308) and the one of the second pair of meshing gears (305).

11. The zero backlash right angle transmission method as claimed in claim 9, wherein the input gear, the first drive gear and the second drive gear (106, 107, 108; 306, 307, 308; 506, 507, 508; 706, 707, 708) are selected from the group consisting of spur gears, single helical gears, and double helical gears; and wherein the first and second pairs of meshing gears (102, 104, 103, 105; 302, 304, 303, 305; 502, 504, 503, 505; 702, 704, 703, 705) are selected from the group consisting of Bevel gears, Miter gears, crown gears, hypoid gears, and spiral helical gears.

* * * * *